(12) United States Patent
Mori et al.

(10) Patent No.: US 10,592,682 B2
(45) Date of Patent: Mar. 17, 2020

(54) DATA STORAGE APPARATUS, DATA PROCESSING METHOD, AND COMPUTER READABLE MEDIUM ADDING A USER ATTRIBUTE OF A REVOKED USER TO AN EMBEDDED DECRYPTION CONDITION WHILE ENCRYPTED DATA REMAINS IN AN ENCRYPTED STATE

(71) Applicant: MITSUBISHI ELECTRIC CORPORATION, Tokyo (JP)

(72) Inventors: Takumi Mori, Tokyo (JP); Yutaka Kawai, Tokyo (JP); Nori Matsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 237 days.

(21) Appl. No.: 15/548,064

(22) PCT Filed: Feb. 20, 2015

(86) PCT No.: PCT/JP2015/054873
§ 371 (c)(1),
(2) Date: Aug. 1, 2017

(87) PCT Pub. No.: WO2016/132546
PCT Pub. Date: Aug. 25, 2016

(65) Prior Publication Data
US 2018/0025172 A1    Jan. 25, 2018

(51) Int. Cl.
*H04L 9/08* (2006.01)
*H04L 9/30* (2006.01)
*G06F 21/62* (2013.01)

(52) U.S. Cl.
CPC ........ *G06F 21/6218* (2013.01); *H04L 9/0894* (2013.01); *H04L 9/30* (2013.01); *H04L 2209/76* (2013.01)

(58) Field of Classification Search
CPC ...... G06F 21/6218; H04L 9/0894; H04L 9/30
(Continued)

(56) References Cited

U.S. PATENT DOCUMENTS 8,171,307 B1   5/2012   Chang
8,913,742 B2  12/2014   Takashima et al.
(Continued)

FOREIGN PATENT DOCUMENTS

CN    103179114 A    6/2013
CN    104113408 A   10/2014
(Continued)

OTHER PUBLICATIONS

Hur et al., "Attribute-Based Access Control with Efficient Revocation in Data Outsourcing Systems", IEEE Transactions on Parallel and Distributed Systems, vol. 22, No. 7, Jul. 2011, pp. 1214-1221.
(Continued)

*Primary Examiner* — Haresh N Patel
(74) *Attorney, Agent, or Firm* — Birch, Stewart, Kolasch & Birch, LLP

(57) ABSTRACT

An encrypted data receiving unit (201) receives encrypted data which has been encrypted, in which a decryption condition to define a user attribute of a decryption-permission user who is permitted to decrypt the encrypted data is embedded. A data storage unit (202) stores the encrypted data received by the encrypted data receiving unit (201) in an encrypted state. A revocation processing unit (209) adds revocation information in which a user attribute of a revoked user who is no longer the decryption-permission user is indicated, to an embedded decryption condition that is embedded in the encrypted data, while the encrypted data remains in an encrypted state.

15 Claims, 32 Drawing Sheets

(58) Field of Classification Search
USPC ........................................................ 713/193
See application file for complete search history.

(56) References Cited

U.S. PATENT DOCUMENTS

| | | | |
|---|---|---|---|
| 9,237,013 B2 | 1/2016 | Ichikawa et al. | |
| 9,635,001 B2 | 4/2017 | Kaseda et al. | |
| 2003/0210790 A1 | 11/2003 | Riedel et al. | |
| 2009/0100529 A1 | 4/2009 | Livnat et al. | |
| 2009/0271638 A1* | 10/2009 | Kawakami | G06F 21/805 713/193 |
| 2009/0327757 A1* | 12/2009 | Kito | G06F 21/80 713/193 |
| 2011/0072266 A1* | 3/2011 | Takayama | G06F 21/445 713/169 |
| 2011/0185192 A1* | 7/2011 | Kito | G06F 21/805 713/193 |
| 2011/0320809 A1 | 12/2011 | Amendola et al. | |
| 2012/0163588 A1* | 6/2012 | Kobayashi | H04L 9/0847 380/28 |
| 2013/0028415 A1 | 1/2013 | Takashima et al. | |
| 2013/0287206 A1* | 10/2013 | Hattori | H04L 9/0836 380/30 |
| 2013/0287210 A1* | 10/2013 | Matsuda | H04L 9/0894 380/44 |
| 2013/0318351 A1* | 11/2013 | Hirano | H04L 9/3073 713/168 |
| 2013/0339726 A1 | 12/2013 | Yoshida et al. | |
| 2014/0247939 A1* | 9/2014 | Hattori | H04L 9/008 380/44 |
| 2014/0298009 A1* | 10/2014 | Hattori | H04L 9/3073 713/155 |
| 2014/0310521 A1 | 10/2014 | Ichikawa et al. | |
| 2014/0351415 A1* | 11/2014 | Harrigan | H04L 43/028 709/224 |
| 2015/0058623 A1* | 2/2015 | Taylor | G06F 21/16 713/165 |
| 2015/0067330 A1* | 3/2015 | Khan | H04L 9/3013 713/168 |
| 2015/0207782 A1* | 7/2015 | Hattori | H04L 9/3073 713/168 |
| 2015/0312260 A1 | 10/2015 | Kim et al. | |
| 2015/0332029 A1* | 11/2015 | Coxe | H04L 63/0815 726/9 |
| 2016/0011990 A1* | 1/2016 | Berengoltz | G06F 21/6218 711/152 |
| 2016/0080332 A1* | 3/2016 | Zombik | H04L 41/28 713/168 |
| 2016/0119292 A1 | 4/2016 | Kaseda et al. | |
| 2016/0182467 A1* | 6/2016 | Hang | H04L 63/0464 713/153 |

FOREIGN PATENT DOCUMENTS

| | | | |
|---|---|---|---|
| JP | 10-260903 A | 9/1998 | |
| JP | 2003-177967 A | 6/2003 | |
| WO | WO 2011/135895 A1 | 11/2011 | |
| WO | WO 2012/111714 A1 | 8/2012 | |
| WO | WO 2013/069505 A1 | 5/2013 | |
| WO | WO 2013/094018 A1 | 6/2013 | |
| WO | WO 2014/083784 A1 | 6/2014 | |
| WO | WO-2014112182 A1 * | 7/2014 | G09C 1/00 |

OTHER PUBLICATIONS

Ito et al., "Revocation Management in Functional Encryption", SCIS 2014, The 31st Symposium on Cryptography and Information Security Kagoshima, Japan, Jan. 21-24, 2014, The Institute of Electronics, Information and Communication Engineers, pp. 1-6.

Jahid et al., "Easier: Encryption-based Access Control in Social Networks with Efficient Revocation", pp. 411-415, Mar. 22-24, 2011.

Kawai et al., "Fully-Anonymous Functional Proxy-Re-Encryption", Oct. 11, 2013, pp. 1-72.

Kawai et al., "Toward Efficient Multi-Hop Functional Proxy-Re-Encryption", SCIS 2014, The 31st Symposium on Cryptography and Information Security Kagoshima, Japan, Jan. 21-24, 2014, The Institute of Electronics, Information and Communication Engineers, pp. 1-8.

Mori et al., "An Easy-to-use File-Sharing System Using Functional Encryption", pp. 746-751, Jul. 2, 2014.

Zu et al., "New Ciphertext-Policy Attribute-Based Encryption with Efficient Revocation", 2014 IEEE International Conference on Computer and Information Technology, pp. 281-287.

Office Action issued in corresponding Chinese Application No. 201580076294.9 dated Dec. 25, 2019.

\* cited by examiner

Fig. 4

| ATTRIBUTE TYPE | VALUE |
|---|---|
| ID | 1 |
| NAME | 2 |
| DEPARTMENT | 3 |
| SECTION | 4 |
| POST | 5 |

| ATTRIBUTE VALUE | VALUE |
|---|---|
| NULL | 0 |
| 1001 | 1 |
| 1002 | 2 |
| 1003 | 3 |
| 1004 | 4 |
| ... | ... |
| HIROSHI TAKAHASHI | 101 |
| TOMOKO KOBAYASHI | 102 |
| KENICHI SUZUKI | 103 |
| TETSUYA SATOU | 104 |
| ... | ... |
| PERSONNEL DEPARTMENT | 201 |
| ACCOUNTING DEPARTMENT | 202 |
| ... | ... |
| BUDGET SECTION | 301 |
| ... | ... |
| CONTACT | 401 |
| SECTION MANAGER | 302 |
| DEPARTMENT MANAGER | 303 |
| ... | ... |

Fig. 6

| | NEW ATTRIBUTE | OLD ATTRIBUTE |
|---|---|---|
| 1 | REINSTATEMENT<ID=1002, NAME=TOMOKO KOBAYASHI, DEPARTMENT=ACCOUNTING DEPARTMENT, SECTION=BUDGET SECTION, POST=CONTACT | TEMPORARY RETIREMENT |
| 2 | RETIREMENT | ID=1004, NAME=TETSUYA SATOU, DEPARTMENT=ACCOUNTING DEPARTMENT, SECTION=BUDGET SECTION, POST=SECTION MANAGER |
| 3 | SECONDMENT<○○UNIVERSITY△△FACULTY PERMANENT VISITING PROFESSOR | ID=1003, NAME=KENICHI SUZUKI, DEPARTMENT=ACCOUNTING DEPARTMENT, SECTION=NULL, POST=DEPARTMENT MANAGER |
| 4 | ID=1001, NAME=HIROSHI TAKAHASHI, DEPARTMENT=ACCOUNTING DEPARTMENT, SECTION=NULL, POST=DEPARTMENT MANAGER | ID=1001, NAME=HIROSHI TAKAHASHI, DEPARTMENT=PESONNEL DEPARTMENT, SECTION=NULL, POST=DEPARTMENT MANAGER |
| 5 | ID=1002, NAME=TOMOKO TANAKA, DEPARTMENT=ACCOUNTING DEPARTMENT, SECTION=BUDGET SECTION, POST=CONTACT | ID=1002, NAME=TOMOKO KOBAYASHI, DEPARTMENT=ACCOUNTING DEPARTMENT, SECTION=BUDGET SECTION, POST=CONTACT |

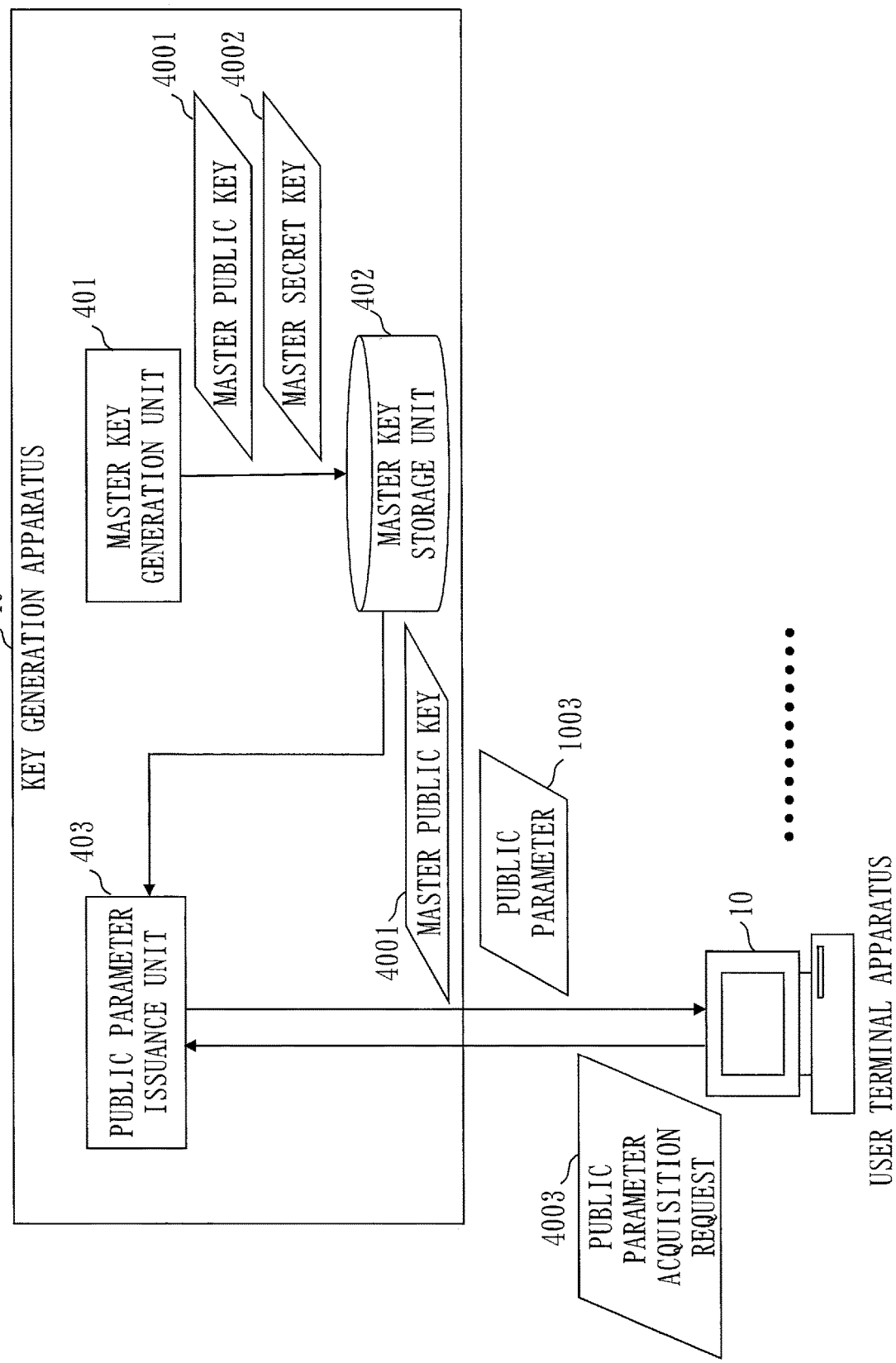

Fig. 12

| ATTRIBUTE TYPE | ATTRIBUTE VALUE |
|---|---|
| ID | 1001, 1002, 1003, 1004 |
| NAME | HIROSHI TAKAHASHI, TOMOKO KOBAYASHI, KENICHI SUZUKI, TETSUYA SATOU |
| DEPARTMENT | ACCOUNTING DEPARTMENT, PERSONNEL DEPARTMENT |
| SECTION | ACCOUNTING SECTION, BUDGET SECTION |
| POST | DEPARTMENT MANAGER, SECTION MANAGER, CONTACT |

Fig. 13

| USER NAME | USER ATTRIBUTE |
|---|---|
| HIROSHI TAKAHASHI | ID=1001, NAME=HIROSHI TAKAHASHI, DEPARTMENT=PESONNEL DEPARTMENT, SECTION=NULL, POST=DEPARTMENT MANAGER |
| TOMOKO KOBAYASHI | ID=1002, NAME=TOMOKO KOBAYASHI, DEPARTMENT=ACCOUNTING DEPARTMENT, SECTION=BUDGET SECTION, POST=CONTACT |
| KENICHI SUZUKI | ID=1003, NAME=KENICHI SUZUKI, DEPARTMENT=ACCOUNTING DEPARTMENT, SECTION=NULL, POST=DEPARTMENT MANAGER |
| TETSUYA SATOU | ID=1004, NAME=TETSUYA SATOU, DEPARTMENT=ACCOUNTING DEPARTMENT, SECTION=BUDGET SECTION, POST=SECTION MANAGER |

Fig. 16

| USER ID | USER NAME | BELONGING DEPARTMENT | BELONGING SECTION | POST |
|---|---|---|---|---|
| 1003 | KENICHI SUZUKI | ACCOUNTING DEPARTMENT | NULL | DEPARTMENT MANAGER |
| 1004 | TETSUYA SATOU | ACCOUNTING DEPARTMENT | BUDGET SECTION | SECTION MANAGER |
| 1002 | TOMOKO KOBAYASHI | ACCOUNTING DEPARTMENT | BUDGET SECTION | CONTACT |
| 1001 | HIROSHI TAKAHASHI | PERSONNEL DEPARTMENT | NULL | DEPARTMENT MANAGER |

Fig. 19

| PERSON/GROUP | INDIVIDUAL PERSON | | | GROUP | | |
|---|---|---|---|---|---|---|
| TYPE | JOINING GROUP | SEPARATION FROM GROUP | TRANSFER BETWEEN GROUPS | GENERATION OF GROUP | REMOVAL OF GROUP | CHANGE OF GROUP |
| RESTORATION OF DECRYPTION CONDITION IS UNNECESSARY | JOINING COMPANY, EMPLOYMENT TRANSFER | RETIREMENT, EMPLOYMENT TRANSFER | TRANSFER BETWEEN DEPARTMENTS AND GROUPS, CHANGE OF POST, CHANGE OF NAME | GENERATION OF DEPARTMENT AND GROUP | REMOVAL OF DEPARTMENT AND GROUP | NAME CHANGE OF DEPARTMENT AND GROUP |
| RESTORATION OF DECRYPTION CONDITION IS NECESSARY | REINSTATEMENT, DISSOLUTION OF HOSTING ASSIGNED EMPLOYEE | SECONDMENT, TEMPORARY RETIREMENT | IN RESIDENCE | — | — | — |

Fig. 20

| PERSON/GROUP | INDIVIDUAL PERSON | | | | GROUP | | |
|---|---|---|---|---|---|---|---|
| TYPE | JOINING GROUP | SEPARTION FROM GROUP | TRANSFER BETWEEN GROUPS | | GENERATION OF GROUP | REMOVAL OF GROUP | CHANGE OF GROUP |
| RESTORATION OF DECRYPTION CONDITION IS UNNECESSARY | NEWLY ISSUE DECRYPTION KEY | COLLECT DECRYPTION KEY OR IT REMAINS UNCHANGED | CHANGE (REISSUE) ATTRIBUTE IN DECRYPTION KEY | | DECRYPTION KEY REMAINS UNCHANGED | DECRYPTION KEY REMAINS UNCHANGED | DECRYPTION KEY REMAINS UNCHANGED (CHANGE ONLY ATTRIBUTE STRING) |
| RESTORATION OF DECRYPTION CONDITION IS NECESSARY | DECRYPTION KEY REMAINS UNCHANGED | DECRYPTION KEY REMAINS UNCHANGED | DECRYPTION KEY REMAINS UNCHANGED | | — | — | — |

Fig. 31

| ACCESS RIGHT CHANGE TYPE | USER ATTRIBUTE OR DECRYPTION CONDITION AS CHANGE OBJECT | DECRYPTION CONDITION TO BE RESET |
|---|---|---|
| REVOCATION | ID = 1003, NAME = KENICHI SUZUKI, DEPARTMENT =ACCOUNTING DEPARTMENT, SECTION = NULL, POST = DEPARTMENT MANAGER | — |
| RESTORATION OF DECRYPTION CONDITION | ID = 1001, NAME = HIROSHI TAKAHASHI, DEPARTMENT =PERSONNEL DEPARTMENT, SECTION = NULL, POST = DEPARTMENT MANAGER | — |
| RESETTING OF DECRYPTION CONDITION | DEPARTMENT = GENERAL AFFAIRS DEPARTMENT AND SECTION = GENERAL AFFAIRS SECTION | DEPARTMENT = GENERAL AFFAIRS DEPARTMENT AND SECTION = BUDGET SECTION |

DATA STORAGE APPARATUS, DATA PROCESSING METHOD, AND COMPUTER READABLE MEDIUM ADDING A USER ATTRIBUTE OF A REVOKED USER TO AN EMBEDDED DECRYPTION CONDITION WHILE ENCRYPTED DATA REMAINS IN AN ENCRYPTED STATE

TECHNICAL FIELD

The present invention relates to techniques for managing encrypted data.

BACKGROUND ART

In recent years, use methods have been widely employed, in which file servers on the Internet store electronic data (hereinafter simply referred to as data) and various devices (for example, a notebook PC (Personal Computer), a tablet terminal and a smart phone) access the file servers and use the data.

Such use methods of data are highly convenient, whereas the user methods involve a risk that an unintended third party on the Internet refers to the data.

Therefore, operation of information security, such as encryption and access control, is essential for confidential data.

There is a method described in Patent Literature 1 as a method to execute encryption of and access control on confidential data.

In the method of Patent Literature 1, encryption keys are managed for each group capable of decrypting encrypted data.

In addition, in the method of Patent Literature 1, addition of a member to or deletion of a member from the group capable of decrypting while keeping the encrypted data encrypted.

In business organizations, a change in groups is often triggered by personnel transfers.

The method in Patent Literature 1 is capable of handling a simple personnel transfer event like joining or retirement from a company, whereas the method is incapable of handling complicated personnel transfer events.

For example, in the method of Patent Literature 1, when a complicated personnel transfer event, such as dissolution of secondment or reinstatement after temporary retirement, etc. occurs, it is unable to return the group capable of decryption to a state before secondment or a state before temporary retirement.

Thus, as an encryption technique that satisfies both of complicated access control and encryption, there exists an encryption technique called a functional encryption scheme described in Patent Literature 2.

The functional encryption scheme is a type of a public key cryptosystem.

Unlike an RSA (registered trademark) encryption currently used as the mainstream, the functional encryption scheme is an encryption scheme which enables decryption of encrypted data that has been encrypted with a decryption key to restore the data when a prescribed relation is established between a parameter (hereinafter referred to as a decryption condition) set at the time of encrypting the data, and a parameter (hereinafter referred to as attribute information) set to the decryption key.

For example, a logical formula such as "department=general affairs department AND section=personnel section" is set as a decryption condition at the time of encrypting data, and "department=general affairs department, section=accounting section" is set for a decryption key as attribute information representing a holder of the decryption key.

Then, decryption of the encrypted data is possible only when relation between the decryption condition set at the time of encrypting the data, and the attribute information set for the decryption key is true.

Hereinafter, encrypted data and a decryption condition are collectively called an encrypted file.

As a method to change a decryption condition while keeping an encrypted file that has been encrypted in a functional encryption scheme encrypted, there is a method as described in Non-patent Literature 1.

The scheme described in Non-patent Literature 1 is referred to as a proxy re-encryption scheme.

In the proxy re-encryption scheme, by using a key for re-encryption referred to as a re-encryption key, it is possible to change a decryption condition without decrypting the encrypted file.

However, the scheme described in Non-patent Literature 1 is inefficient, whereby re-encryption can be executed only one to a few times in practice.

Therefore, in the scheme of Non-Patent Literature 2, efficiency is improved from the scheme of Non-Patent Literature 1, where there is no practical limit in the number of re-encryption.

CITATION LIST

Patent Literature

Patent Literature 1: WO 2013/069505 A
Patent Literature 2: WO 2011/135895 A

Non-Patent Literature

Non-Patent Literature 1: Y. Kawai and K. Takashima, "Fully-Anonymous Functional Proxy-Re-Encryption," ePrint 2013
Non-Patent Literature 2: Yutaka Kawai and Katsuyuki Takashima, "Toward Efficient Multi-Hop Functional Proxy-Re-Encryption," SCIS2014

SUMMARY OF INVENTION

Technical Problem

As an issue associated with a file encryption system in a business organization, there is a case wherein a personnel transfer is handled while data remains encrypted.

The issue will be described in detail by taking the method in Patent Literature 1 mentioned above as an example.

In the scheme of Patent Literature 1, it is made possible to add a member to and delete a member from the group capable of decryption while encrypted data remains encrypted, by managing the group capable of decrypting particular encrypted data, and applying re-encryption scheme to a group key.

However, complicated personnel transfer events such as secondment, temporary retirement, etc. cannot be handled only by a simple method of addition of a member to or deletion of a member from the group.

Processing of "revocation" is necessary, which makes encrypted data that has been available for inspection by a temporarily-transferred user or a temporarily-retired user before secondment or temporary retirement unavailable for inspection at the time of secondment or temporary retirement.

Further, processing of dissolution of "revocation" is necessary at the time of dissolution of secondment or reinstatement after temporary retirement.

In a case where simple addition of a member to or deletion of a member from the group capable of decryption is carried out, once the processing of "revocation" (deletion of a member) is executed, it is impossible to determine which group (encrypted data) to add the member whose secondment has been dissolved or the member who has returned to work after temporary retirement when dissolution of "revocation" is to be implemented.

In the present description, such revocation which may be dissolved after revocation is referred to as temporary revocation.

Contrastively, revocation based on employment transfer without a possibility for a retired person or a permanently-transferred person to return to the original group due to retirement or employment transfer is referred to as permanent revocation.

The Patent Literature 1 has a problem that it cannot handle temporary revocation, whereas it can handle permanent revocation.

In regard to this problem, the functional encryption scheme in Non-Patent Literature 1 can handle temporary revocation, by altering decryption conditions for encrypted data to execute revocation processing in response to a personnel transfer event (for example, secondment or temporary retirement), and by altering the decryption conditions for the encrypted data to execute dissolution processing of revocation in response to a personnel transfer event (for example, dissolution of secondment or reinstatement).

In the functional encryption scheme of Non-Patent Literature 1, in order to alter the decryption conditions in response to personnel transfer events while the decryption conditions for the encrypted data remains encrypted, it is necessary to use the proxy re-encryption scheme in Non-Patent Literature 2.

However, in the proxy re-encryption scheme in Non-Patent Literature 2, issuance of a key for re-encryption, and re-encryption of the encrypted data and the decryption conditions using a re-encryption apparatus (proxy, also called PROXY) are necessary.

The present invention is aimed at solving such a problem, and is mainly aimed at obtaining a configuration capable of handling temporary revocation without executing re-encryption of encrypted data and decryption conditions.

Solution to Problem

A data storage apparatus according to the present invention includes:

an encrypted data receiving unit to receive encrypted data which has been encrypted, in which a decryption condition, whereby a user attribute of a decryption-permission user who is permitted to decrypt the encrypted data is defined, is embedded;

a data storage unit to store the encrypted data that has been received by the encrypted data receiving unit, in an encrypted state; and a revocation processing unit to add revocation information in which a user attribute of a revoked user who is no longer the decryption-permission user is indicated, to an embedded decryption condition that is embedded in the encrypted data, while the encrypted data remains in the encrypted state.

Advantageous Effects of Invention

According to the present invention, revocation information wherein a user attribute of a revoked user is described is added to an embedded decryption condition while encrypted data remains in an encrypted state.

Thus, according to the present invention, it is possible to handle temporary revocation without executing re-encryption of encrypted data and a decryption condition.

BRIEF DESCRIPTION OF DRAWINGS

FIG. 4 is a diagram illustrating an example of a correspondence table according to the first embodiment;

FIG. 6 is a diagram illustrating an example of personnel transfer information according to the first embodiment;

FIG. 7 is a diagram illustrating a configuration example of function modules in a key generation apparatus according to the first embodiment;

FIG. 12 is a diagram illustrating an example of attribute types and attribute values according to the first embodiment;

FIG. 13 is a diagram illustrating an example of a list of users according to the first embodiment;

FIG. 16 is a diagram illustrating an example of information stored in a user information terminal apparatus according to the first embodiment;

FIG. 19 is a diagram illustrating an example of personnel transfer events according to the first embodiment;

FIG. 20 is a diagram illustrating handling of a decryption key for each personnel transfer event according to the first embodiment;

FIG. 31 is a diagram illustrating an example of an access right change request according to the second embodiment;

DESCRIPTION OF EMBODIMENTS

First Embodiment

In the present embodiment and the following embodiments, a file encryption system using a functional encryption scheme will be described.

In the file encryption system according to the present embodiment and the following embodiments, by adding a NOT condition (revocation information) to a decryption condition while encrypted data remains encrypted, "revocation" is realized without executing re-encryption, taking advantage of the characteristics of the functional encryption scheme.

In the present embodiment, a method to encrypt data by a client (user terminal apparatus) in a client server model will be described.

Further, in the present embodiment, a method to store encrypted data and a decryption condition in a data storage apparatus will be described.

Furthermore, a method to decrypt the encrypted data stored will be described.

Additionally, a method to update the encrypted file in a case where a personnel transfer takes place will be described.

\*\*\*Explanation of Configuration\*\*\*

<Configuration and Function of File Encryption System 1>

Figure 1:
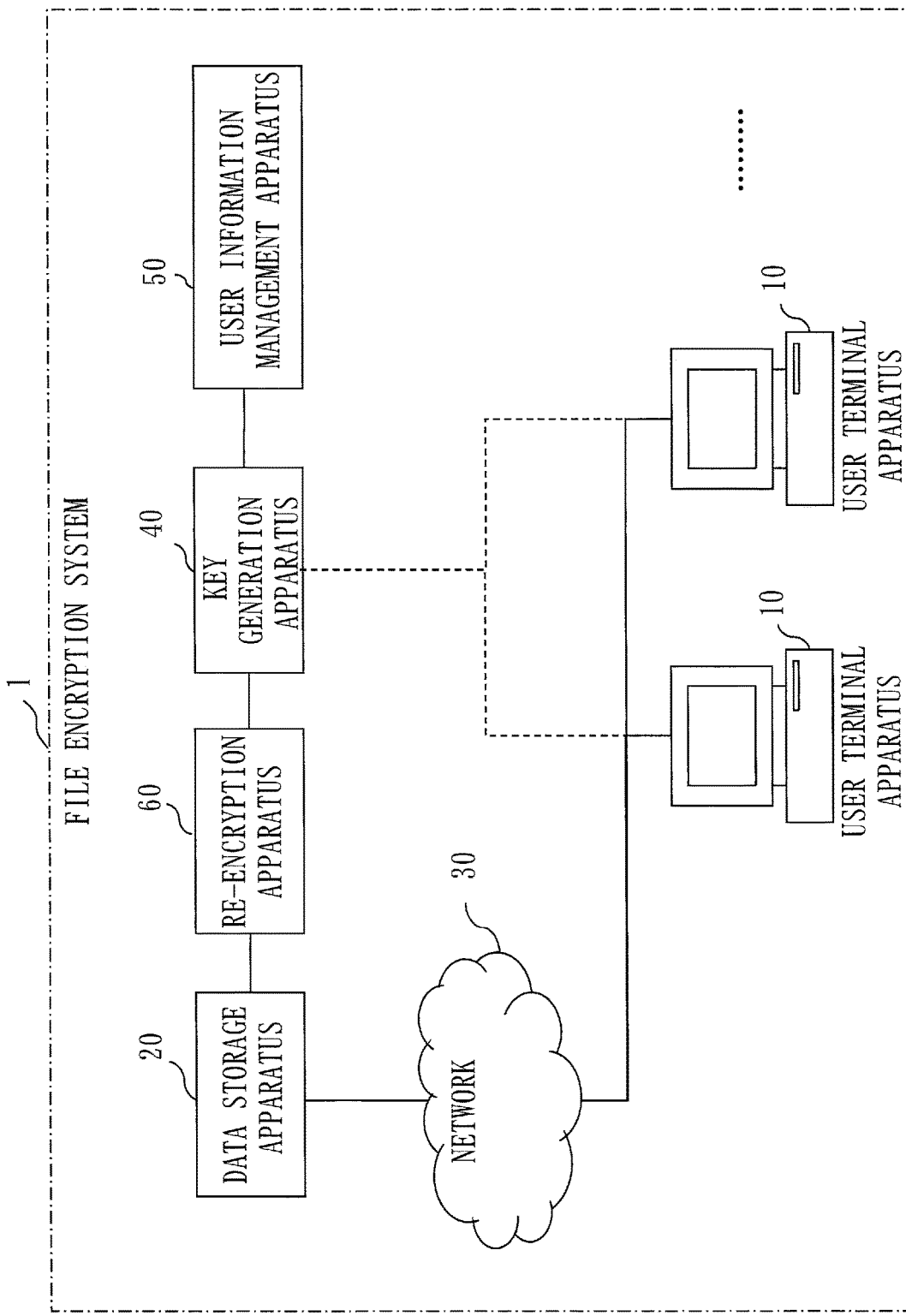
FIG. 1 is a diagram illustrating a configuration example of a file encryption system according to a first embodiment.

FIG. 1 is a diagram illustrating a configuration example of a file encryption system 1 according to the first embodiment.

As illustrated in FIG. 1, in the file encryption system 1, one or more user terminal apparatuses 10 are connected to a data storage apparatus 20 via a network 30.

Further, a key generation apparatus 40 is connected to a user information management apparatus 50.

Additionally, a re-encryption apparatus 60 is connected to the data storage apparatus 20 and the key generation apparatus 40.

The key generation apparatus 40 is connected to the user terminal apparatus 10 only when needed in such a case as distributing a key, etc.

The user terminal apparatus 10 is a client apparatus having a communication function.

The user terminal apparatus 10 is, for example, a desktop PC, a notebook PC, a smart phone, a tablet terminal, and so on.

The data storage apparatus 20 is, for example, a file server apparatus.

The data storage apparatus 20 may be composed of a plurality of computers.

Here, the data storage apparatus 20 may be a so-called cloud storage on the Internet.

However, it is necessary for the data storage apparatus 20 to have reliability capable of realizing a function as a file storage and functions as described below.

The network 30 is, for example, the Internet or a network structured by a dedicated line.

The key generation apparatus 40 is a server apparatus that manages encryption keys.

The key generation apparatus 40 may be composed of a plurality of computers access to which is controlled.

Encryption keys and the like stored inside the key generation apparatus 40 are all managed secretly by encryption or access control.

It will suffice as long as the user information management apparatus 50 is a directory server to manage organization information, such as LDAP (LIGHTWEIGHT Directory Access Protocol) or AD (Active Directory (registered trademark)) of Microsoft (registered trademark) Corp.

The re-encryption apparatus 60 is a server apparatus to re-encrypt encrypted data stored in the data storage apparatus 20 using a re-encryption key issued from the key generation apparatus 40.

The re-encryption apparatus 60 may be composed of a plurality of computers.

Figure 2:
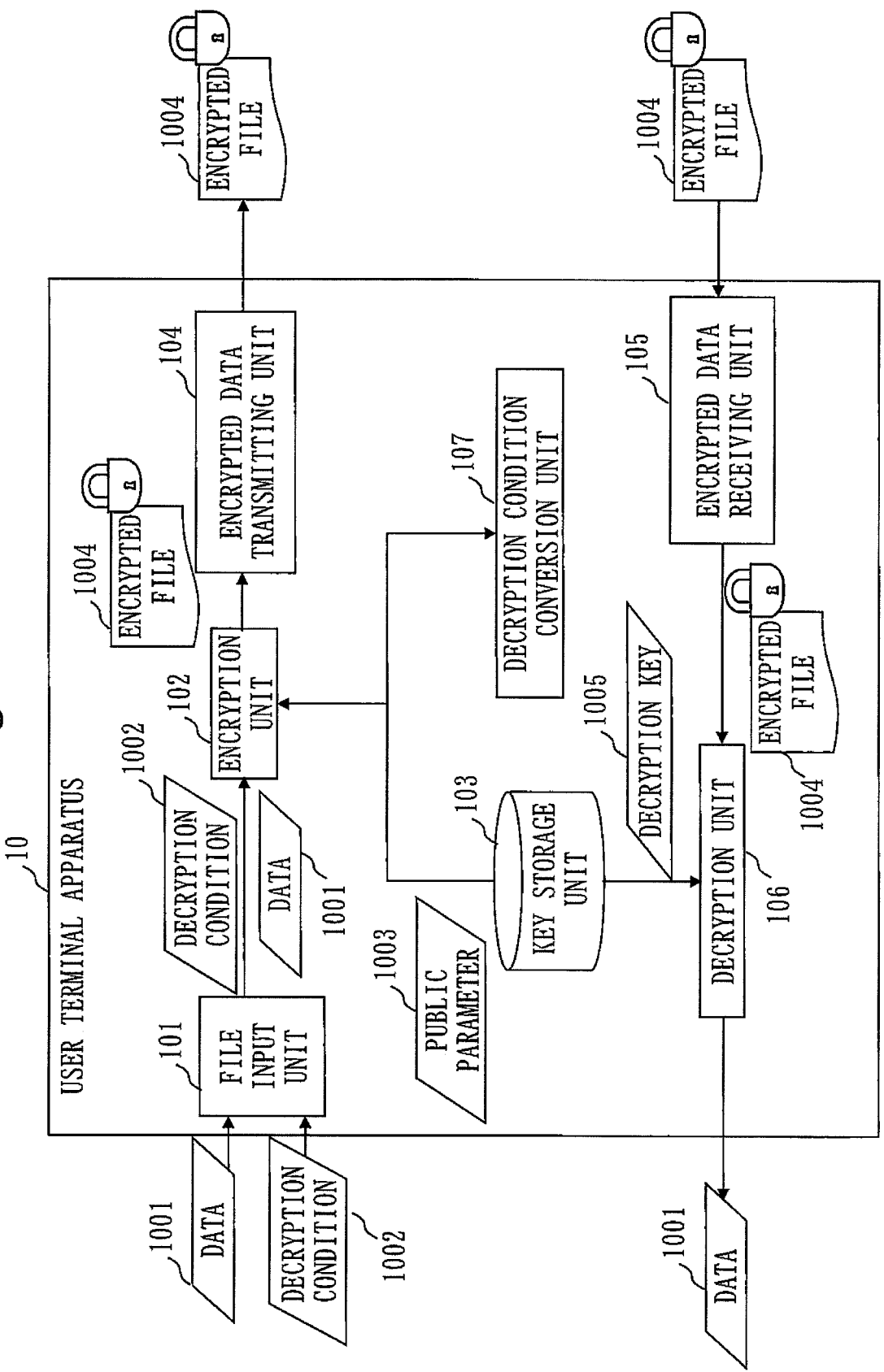
FIG. 2 is a diagram illustrating a configuration example of function modules in a user terminal apparatus according to the first embodiment.

FIG. 2 describes a configuration example of function modules in the user terminal apparatus 10.

Data 1001 is electronic data (plaintext data) as an object to be encrypted using the file encryption system 1 and to be stored.

The data 1001 is, for example, text data, audio data and movie data.

A decryption condition 1002 is information to indicate a user of the user terminal apparatus 10, who is capable of browsing the data 1001.

That is, the decryption condition 1002 is information that defines user attributes of decryption-permission users who are permitted to decrypt the encrypted data.

The decryption condition 1002 is represented in a form of a logical formula.

The decryption condition 1002 is represented by a combination of [attribute type]=[attribute value], operators to connect them, and "( )" indicating evaluation priority of the logical formula, e.g., "department=accounting department AND section=budget section".

As the operator, there are "AND" denoting logical product, "OR" denoting logical sum, "NOT" denoting negation, etc. for example.

A public parameter 1003 is a public key (encryption key) for public key encryption that exists only one in the file encryption system 1.

In the present embodiment, as public key encryption, encryption (for example, functional encryption) wherein a person who is capable of decryption can be designated by a logical formula (also called predicate) is used.

Since the public parameter 1003 is not information to be kept secret, the public parameter 1003 may be stored in an arbitrary place (for example, it may be inside a PC making up the file encryption system 1, an external storage or a server on the Internet, etc.).

An encrypted file 1004 is composed of the data 1001 encrypted using functional encryption with the public parameter 1003 and the decryption condition 1002, and the decryption condition 1002.

Figure 3:
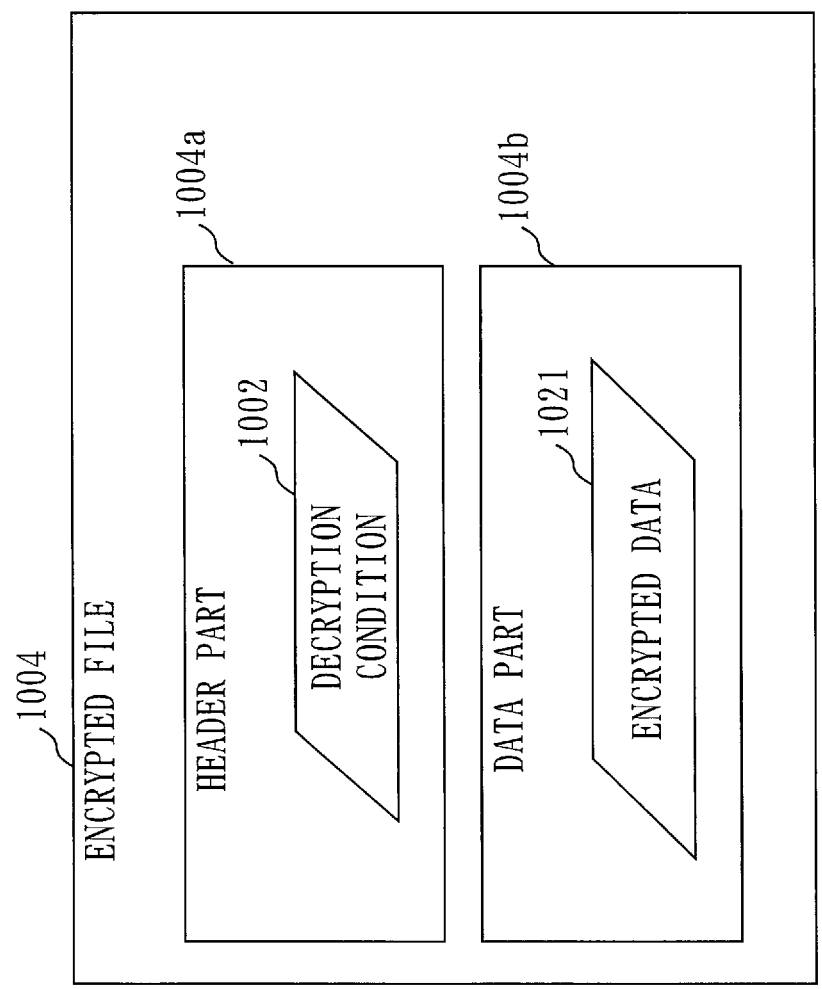
FIG. 3 is a diagram illustrating a header part and a data part of an encrypted file according to the first embodiment.

The encrypted file 1004 is composed of a header part 1004a and a data part 1004b as described in FIG. 3.

In the header part 1004a, the decryption condition 1002 designated at the time of encryption is stored. In the data part 1004b, encrypted data 1021 as the data 1001 encrypted is stored.

In the encrypted data 1021, a decryption condition with the same contents as those of the decryption condition 1002 is embedded.

By encrypting the data 1001 using functional encryption with the decryption condition 1002, it is possible to embed the decryption condition with the same contents as those of the decryption condition 1002 in the encrypted data 1021.

The decryption condition embedded in the encrypted data 1021 will be called an embedded decryption condition.

The embedded decryption condition cannot be retrieved from the encrypted data 1021.

In the following, the decryption condition 1002 may be called an external decryption condition in order to distinguish it from the embedded decryption condition.

A decryption key 1005 is a decryption key for decrypting the encrypted file 1004.

The decryption key 1005 is made to correspond to the decryption-permission users.

In the decryption key 1005, attribute information (represented in a format where [attribute type]=[attribute value] are enumerated like "ID=1001, department=accounting department, section=budget section," for example) of the decryption-permission users is embedded.

Here, decryption of an encrypted file 1004 is possible if a decryption key 1005 has attribute information that matches the decryption condition 1002 designated at the time of encrypting the encrypted file 1004.

A file input unit 101 receives the data 1001 and the decryption condition 1002.

The file input unit 101 transfers the data 1001 and the decryption condition 1002 that have been received, to an encryption unit 102.

The encryption unit 102 receives the data 1001, the decryption condition 1002 and the public parameter 1003 as input and encrypts the data 1001 according to functional encryption with the public parameter 1003, taking the decryption condition 1002 as a parameter.

A key storage unit 103 stores the decryption key 1005 made to correspond to the user terminal apparatus 10, and the public parameter 1003.

An encrypted data transmitting unit 104 transmits the encrypted file 1004 to the data storage apparatus 20.

An encrypted data receiving unit 105 receives the encrypted file 1004 from the data storage apparatus 20, and transfers the encrypted file 1004 received to a decryption unit 106.

The decryption unit 106 retrieves a decryption key 1005 from the key storage unit 103, and restores the encrypted data 1021 to the data 1001 by decrypting the encrypted file 1004 with the decryption key 1005 retrieved.

A decryption condition conversion unit 107 has a function to convert the decryption condition 1002 described by character strings (recognizable by a person) into a numerical format that can be processed in the functional encryption scheme.

The decryption condition conversion unit 107 retains, as a correspondence table, a rule to convert the character strings included in the decryption conditions 1002 into numerical values.

In the correspondence table, the numerical values corresponding to each of the attribute types and the attribute values are recorded as illustrated in FIG. 4.

For example, when the decryption condition is "department=personnel department AND post=department manager," the decryption condition is converted into "3=201 AND 5=303."

Figure 5:
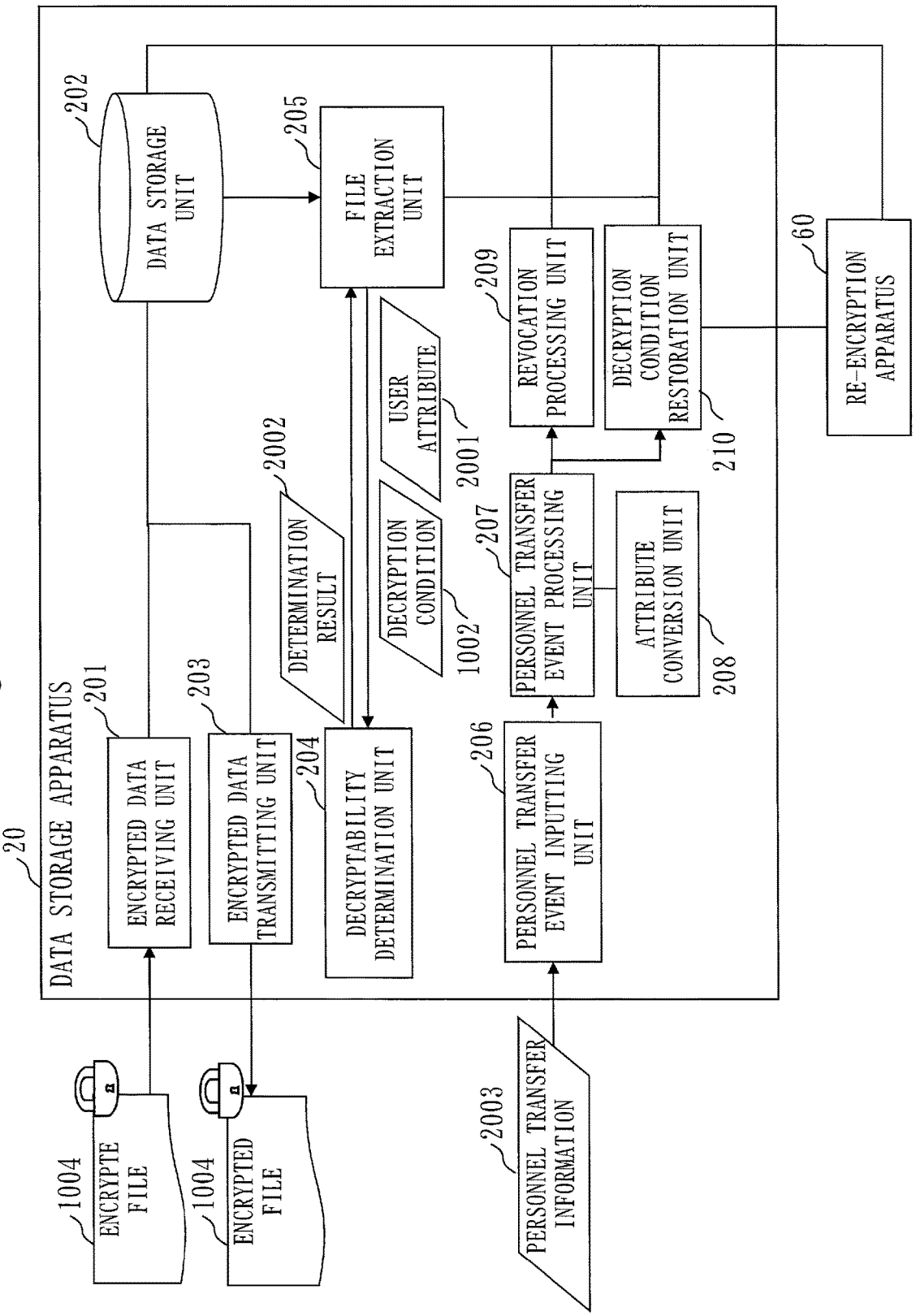
FIG. 5 is a diagram illustrating a configuration example of function modules in a data storage apparatus according to the first embodiment.

FIG. 5 illustrates a configuration example of function modules in the data storage apparatus 20.

An encrypted data receiving unit 201 receives an encrypted file 1004 (encrypted data 1021 and a decryption condition 1002) from a user terminal apparatus 10, and stores the same in a data storage unit 202.

The data storage unit 202 stores one and more encrypted files 1004.

The data storage unit 202 stores the encrypted data 1021 inside the encrypted file 1004 that has been received by the encrypted data receiving unit 201, keeping the encrypted data 1021 in an encrypted state.

An encrypted data transmitting unit 203 transfers the encrypted file 1004 stored in the data storage unit 202 to the user terminal apparatus 10.

A decryptability determination unit 204 determines whether a user attribute 2001 matches the decryption condition 1002 based on the decryption condition 1002 and the user attribute 2001, and returns a determination result 2002 to a file extraction unit 205.

The user attribute 2001 is information representing attributes of a user that is made to correspond to a decryption key 1005.

For example, in a corporation, departments, sections, names and employee IDs (Identifiers) are used for the user attribute 2001.

The representation form of the user attribute 2001 is in a form of enumerating [attribute type]=[attribute value] similarly to that of the decryption condition 1002, e.g., "department=general affairs department, section=personnel section, post=department manager."

The determination result 2002 is data indicating "TRUE" or "FALSE."

The file extraction unit 205 has two behaviors (functions) depending on the order originator.

As the first behavior (function), the file extraction unit 205 retrieves an encrypted file 1004 from the data storage unit 202 in a case of receiving an order from a revocation processing unit 209.

Further, the file extraction unit 205 retrieves a decryption condition 1002 from a header part 1004a of the encrypted file 1004.

In addition, the file extraction unit 205 transfers the decryption condition 1002 retrieved and the user attribute 2001 that has been received from the revocation processing unit 209 to the decryptability determination unit 204, and obtains a determination result 2002.

The file extraction unit 205 performs these operations to all the encrypted files 1004 stored in the data storage unit 202, and transfers the encrypted files 1004 whereof the determination results 2002 are TRUE, to the revocation processing unit 209 to be hereinafter described.

As the second behavior (function), the file extraction unit 205 first retrieves a user ID 4004 as stated below from the user attribute 2001 that has been received from a decryption condition restoration unit 210, in a case of receiving an order from the decryption condition restoration unit 210 to be hereinafter described.

Next, the file extraction unit 205 retrieves the encrypted files 1004 one by one from the data storage unit 202, and retrieves the decryption conditions 1002 from the header parts 1004a of the encrypted files 1004 that have been retrieved.

Further, the file extraction unit 205 extracts encrypted files 1004 including "AND NOT ID=[user ID]" in the decryption conditions 1002 that have been retrieved, and returns the encrypted files 1004 extracted to the decryption condition restoration unit 210.

Personnel transfer information 2003 is composed of old attributes and new attributes as illustrated in FIG. 6, for example.

Personnel transfer events mean what generally occur in a business organization, e.g. change of last name, temporary transfer, retirement, etc. besides transfer between departments and sections.

A personnel transfer event inputting unit 206 receives the personnel transfer information 2003 at the time of occurrence of a personnel transfer event, and transfers the personnel transfer information 2003 to a personnel transfer event processing unit 207.

For example, a person having an authority to access to the personnel transfer information 2003, such as an administrator of the file encryption system 1 or an administrator of a personnel system, etc., for example, inputs the personnel transfer information 2003 to the personnel transfer event inputting unit 206.

Further, when personnel transfer is managed by another system, the said system may input the personnel transfer information 2003 to the personnel transfer event inputting unit 206 automatically.

The personnel transfer event processing unit 207 receives the personnel transfer information 2003 from the personnel transfer event inputting unit 206.

Further, the personnel transfer event processing unit 207 analyzes the contents of the personnel transfer information 2003, and converts the encrypted files 1004 stored in the data storage unit 202 so as to handle the personnel transfer event, using any of an attribute conversion unit 208 as stated below, the revocation processing unit 209 and the decryption condition restoration unit 210, depending on the type of the personnel transfer event.

An attribute conversion unit 208 converts the user attribute 2001 and the decryption condition 1002 described in character strings into a numerical format that can be processed in the functional encryption scheme, similarly to the decryption condition conversion unit 107 in the user terminal apparatus 10.

The attribute conversion unit 208 retains a rule to covert the character strings included in the user attributes 2001 into numerical values, as the correspondence table in FIG. 4.

For example, when the user attribute 2001 of a certain user is "ID=1001, name=Hiroshi Takahashi, department=personnel department, section=NULL, post=department manager," it is converted into "1=1, 2=101, 3=201, 4=0, 5=303."

The revocation processing unit 209 performs revocation processing when secondment or temporary retirement occurs, for example, among personnel transfer events.

That is, the revocation processing unit 209 adds to the embedded decryption condition and the external decryption condition (the decryption condition 1002), revocation information wherein a user attribute 2001 of a revoked user who is no longer a decryption-permission user is indicated, while the encrypted data remains encrypted.

More specifically, the revocation processing unit 209 performs revocation processing by receiving the user attribute 2001 (may only be ID information in a case of cooperating with a directory service) of the revoked user from the personnel transfer event processing unit 207, and by adding the condition (revocation information) of "AND NOT [ID information]" to the decryption condition 1002 in the encrypted file 1004 and the embedded decryption condition inside the encrypted data 1021, while the encrypted data 1021 remains encrypted.

When dissolution of secondment or reinstatement occurs, for example, among personnel transfer events, the decryption condition restoration unit 210 performs restoration processing of a decryption condition which is processing to allow the revoked user to browse the encrypted data, which had been browsable before secondment or terminal retirement.

That is, the decryption condition restoration unit 210 removes the revocation information added by the revocation processing unit 209 from the decryption condition 1002 and the embedded decryption condition while the encrypted data 1021 remains encrypted.

More specifically, the decryption condition restoration unit 210 removes "AND NOT [ID information]" condition (revocation information) additionally provided by the revocation processing unit 209 to the encrypted file 1004, in the proxy re-encryption scheme as disclosed in Non-Patent Literature 2.

Here, a data processing method and a data processing program according to the present application are realized by the encrypted data receiving unit 201, the data storage unit 202 and the revocation processing unit 209.

That is, the processing contents of the encrypted data receiving unit 201 correspond to encrypted data receiving processing, the processing contents of the data storage unit 202 correspond to data storage processing, and the processing contents of the revocation processing unit 209 correspond to revocation processing.

Figure 8:
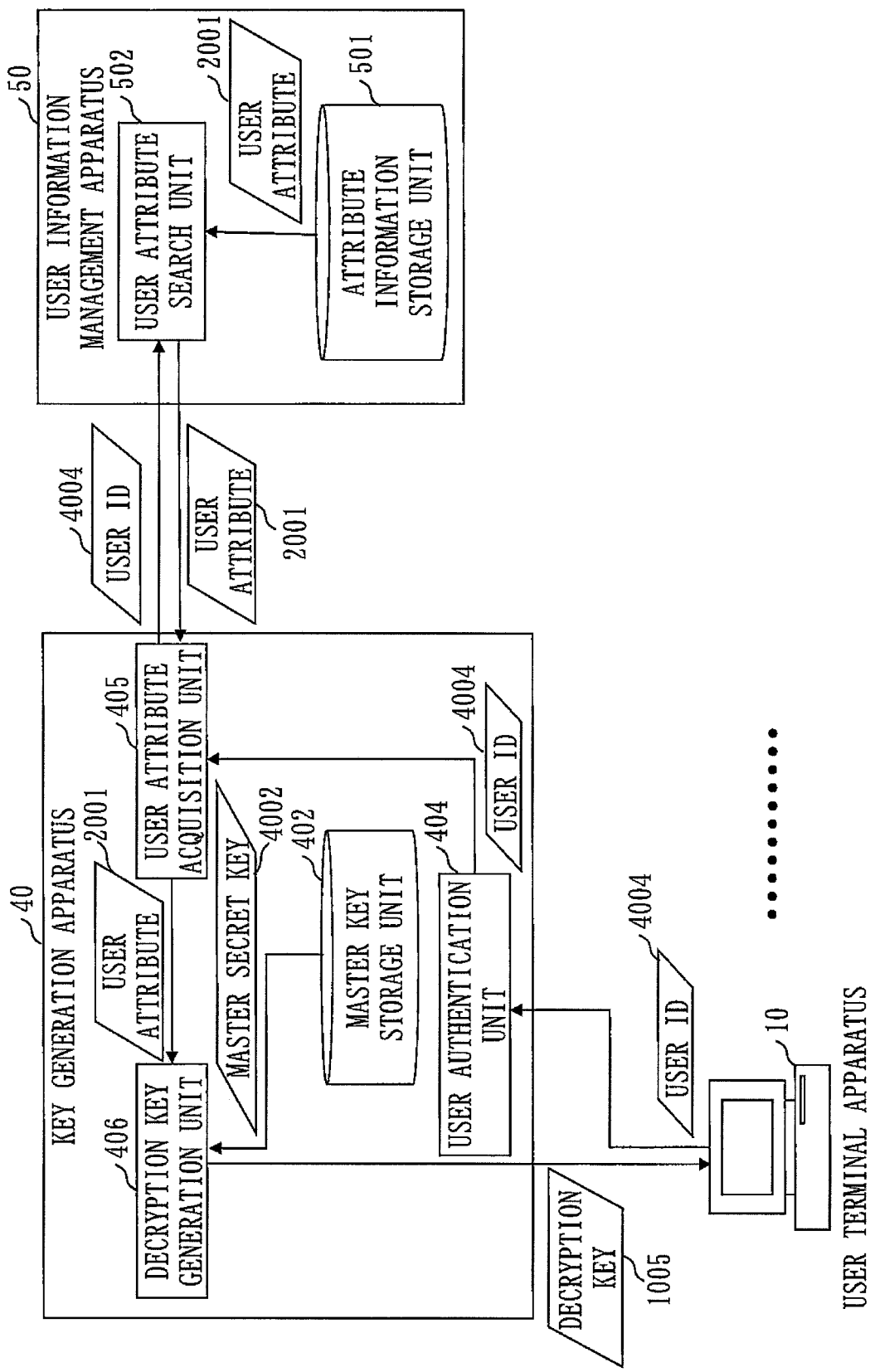
FIG. 8 is a diagram illustrating a configuration example of function modules in the key generation apparatus and a configuration example of function modules in a user information management apparatus according to the first embodiment.
Figure 9:
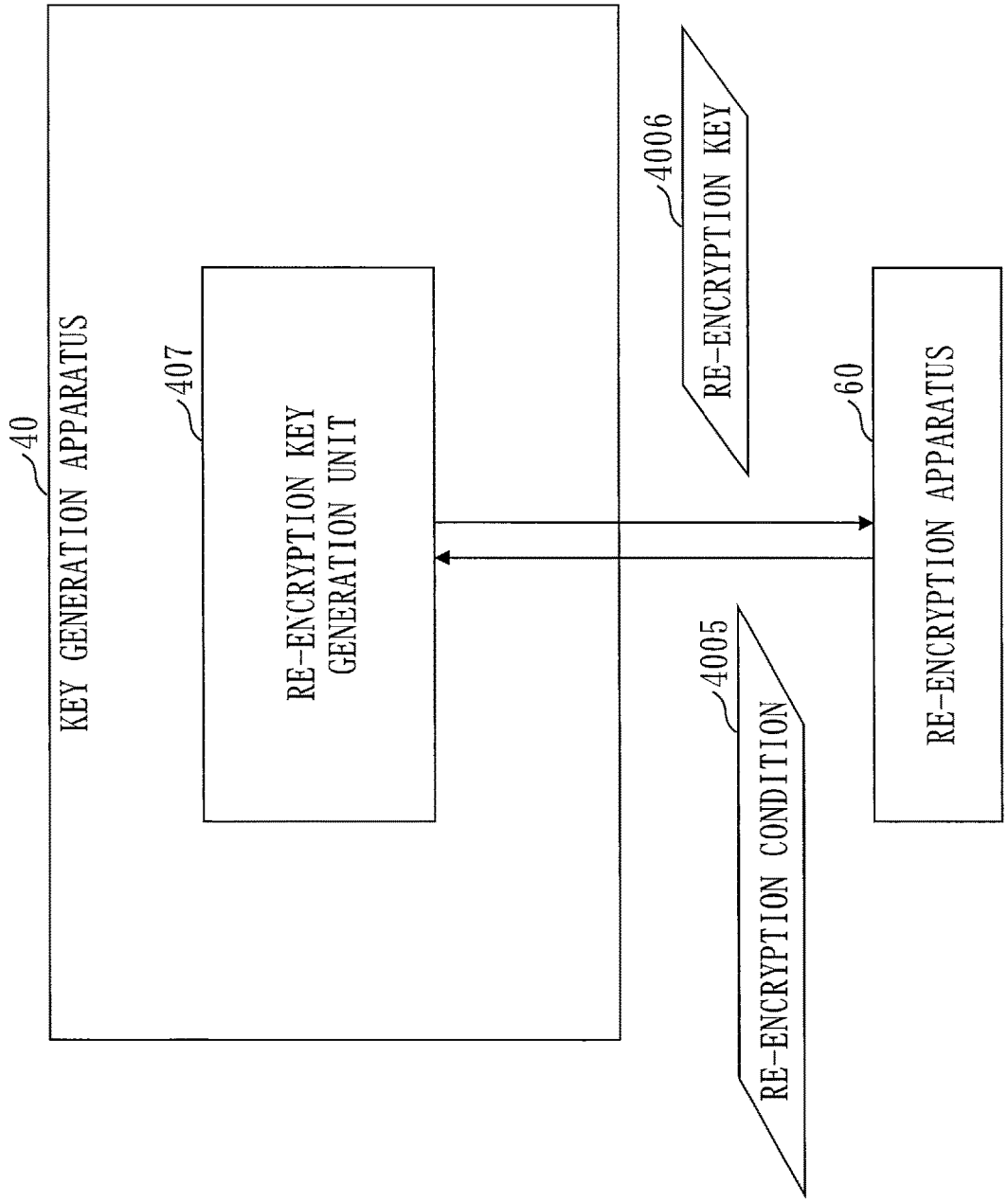
FIG. 9 is a diagram illustrating a configuration example of function modules in the key generation apparatus according to the first embodiment.

FIG. 7 through FIG. 9 illustrate configuration examples of function modules in the key generation apparatus 40 and the user information management apparatus 50.

Here, in FIG. 7 through FIG. 9, the configuration of the function modules in the key generation apparatus 40 is illustrated by dividing the configuration for each processing.

The key generation apparatus 40 is composed of a master key generation unit 401, a master key storage unit 402, a public parameter issuance unit 403, a user authentication unit 404, a user attribute acquisition unit 405, a decryption key generation unit 406 and a re-encryption key generation unit 407, as described in FIG. 7 through FIG. 9.

(Explanation of FIG. 7)

A master public key 4001 and a master secret key 4002 are originally generated and retained by the key generation apparatus 40.

Usually, only one pair of a master public key 4001 and a master secret key 4002 is generated for the file encryption system 1.

While the master public key 4001 is public information, the master secret key 4002 can generate all the decryption keys 1005; therefore, it is necessary to store the master secret key 4002 secretly inside the key generation apparatus 40 in some manner.

A public parameter acquisition request 4003 is request data to be issued for acquiring the public parameter 1003.

For example, if HTTP (Hypertext Transfer Protocol) is used for communication between the user terminal apparatuses 10 and the key generation apparatus 40, when the user terminal apparatuses 10 acquire the public parameter 1003, the public parameter acquisition request 4003 is a public parameter acquisition URL (Uniform Resource Locator).

The master key generation unit 401 generates a pair (hereinafter called a master-key pair) of a master public key 4001 and a master secret key 4002.

The master key storage unit 402 stores the master-key pair generated by the master key generation unit 401.

The public parameter issuance unit 403 generates the public parameter 1003 by the key generation apparatus 40 applying a digital signature to the master public key 4001.

Since the public parameter 1003 is public information, it is possible to deliver the public parameter 1003 using means of WEB disclosure, e-mail transmission, and sending in a data recording medium, etc.

(Explanation of FIG. 8)

A user ID 4004 is information (for example, an employee number or a mail address) whereby a user can be uniquely identified.

The user authentication unit 404 authenticates a user ID 4004 received from a user terminal apparatus 10.

The user authentication unit 404 may perform authentication using an electronic certificate, or authentication using a password, for example.

The user attribute acquisition unit 405 acquires a user attribute 2001 taking the user ID 4004 as a key, from the user information management apparatus 50 as stated below.

The decryption key generation unit 406 generates a decryption key 1005 using the master secret key 4002 and the user attribute 2001.

(Explanation of FIG. 9)

A re-encryption condition 4005 is a new decryption condition to be designated at the time of re-encrypting the encrypted file 1004.

A re-encryption key 4006 is a key used at the time of re-encrypting the encrypted file 1004.

Receiving the re-encryption condition 4005 as input, the re-encryption key generation unit 407 generates the re-encryption key 4006 and transmits the re-encryption key 4006 to the re-encryption apparatus 60.

The user information management apparatus 50 is an apparatus for managing organization information like a directory server, for example (FIG. 8).

An attribute information storage unit 501 stores attribute information (for example, full name, age, gender, department, section, post, etc.) of an organization and people belonging to the organization.

It is assumed that the attribute information of the organization is managed by the organization, and the user attributes 2001 of all the users are stored beforehand.

A user attribute search unit 502 acquires a user attribute 2001 from the attribute information storage unit 501 by taking a user ID 4004 as a key.

Figure 10:
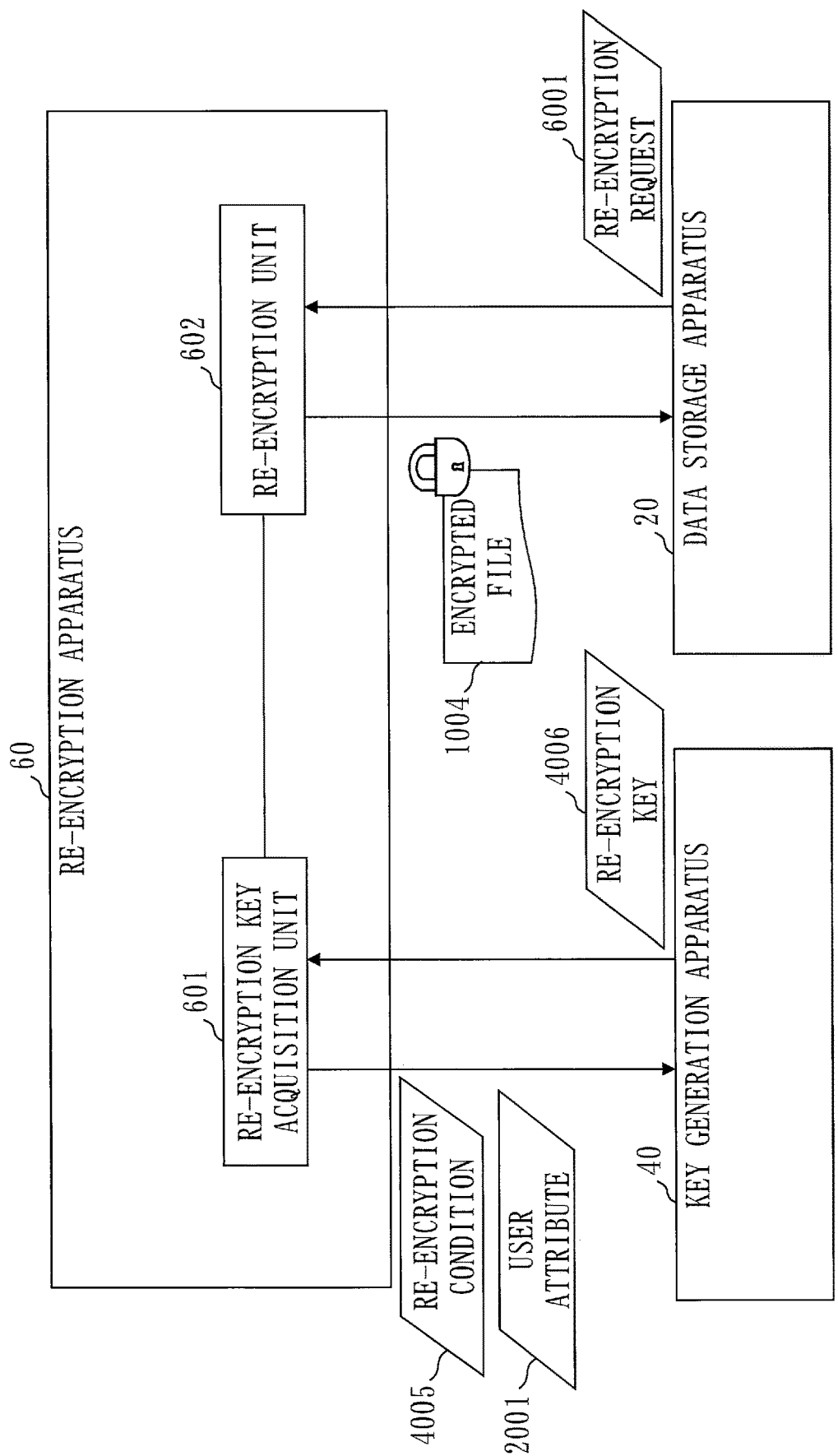
FIG. 10 is a diagram illustrating a configuration example of function modules in a re-encryption apparatus according to the first embodiment.

FIG. 10 describes a configuration example of function modules in the re-encryption apparatus 60.

Figure 11:
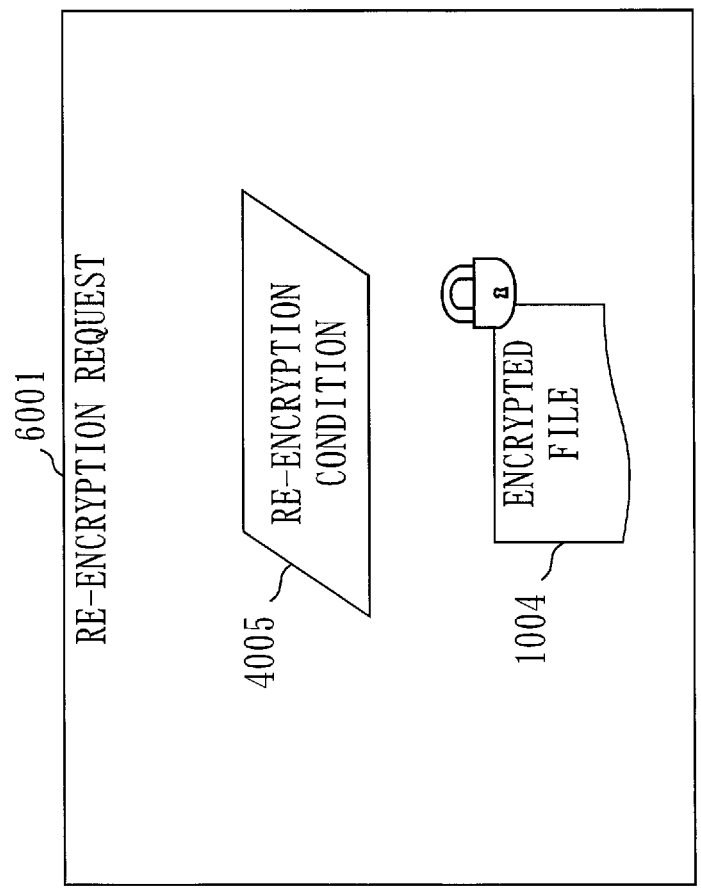
FIG. 11 is a diagram illustrating an example of a re-encryption request according to the first embodiment.

In a re-encryption request 6001, a re-encryption condition 4005 and an encrypted file 1004 are stored, as illustrated in FIG. 11.

A re-encryption key acquisition unit 601 transmits a user attribute 2001 and a re-encryption condition 4005 to the key generation apparatus 40 and acquires a re-encryption key 4006 from the key generation apparatus 40.

A re-encryption unit 602 receives a re-encryption request 6001 from the data storage apparatus 20, and acquires a re-encryption key 4006 using the re-encryption key acquisition unit 601.

Further, the re-encryption unit 602 re-encrypts the encrypted file 1004 included in the re-encryption request 6001, and returns the encrypted file 1004 re-encrypted to the data storage apparatus 20.

*Explanation of Operations*

Next, the operations of the file encryption system 1 according to the present embodiment will be described.

FIG. 12 is a list of attribute types and attribute values used for representation of the user attributes 2001 supposed in the present embodiment.

A user attribute 2001 is represented in a form of [attribute type=attribute value], and is able to have a plurality of attributes in such a manner as "department=accounting department, section=budget section."

FIG. 13 is a list of users supposed in the present embodiment.

User attributes are assigned to each respective user.

If there is no relevant attribute, a NULL symbol is made to be an attribute value.

It is assumed that the information exemplified in FIG. 13 is stored in the user information management apparatus 50 beforehand.

<Distribution of Public Parameter and Decryption Key>

An example of a method to distribute the public parameter 1003 and the decryption keys 1005 to the user terminal apparatuses 10 will be described.

Generation and distribution of the public parameter 1003 and the decryption keys 1005 may be performed at the time of initial setting when the file encryption system 1 is introduced.

Meanwhile, generation and distribution of the public parameter 1003 and the decryption keys 1005 may be performed at the time when the public parameter 1003 and the decryption keys 1005 become necessary in encryption processing and decryption processing.

In the file encryption system 1, the functional encryption scheme is used.

In the functional encryption scheme, the master key generation unit 401 (FIG. 7) generates a master-key pair first.

While the master-key pair may be prepared one pair for each file encryption system, the master key generation unit 401 may generate master-key pairs for a plurality of file encryption systems 1.

In such a case, association is made for which file encryption system 1 to correspond to which master-key pair.

Then, the decryption key generation unit 406 (FIG. 8) generates the decryption keys 1005 (these are called user secret keys in the functional encryption) from the user attributes 2001 and the master secret key 4002.

Figure 14:
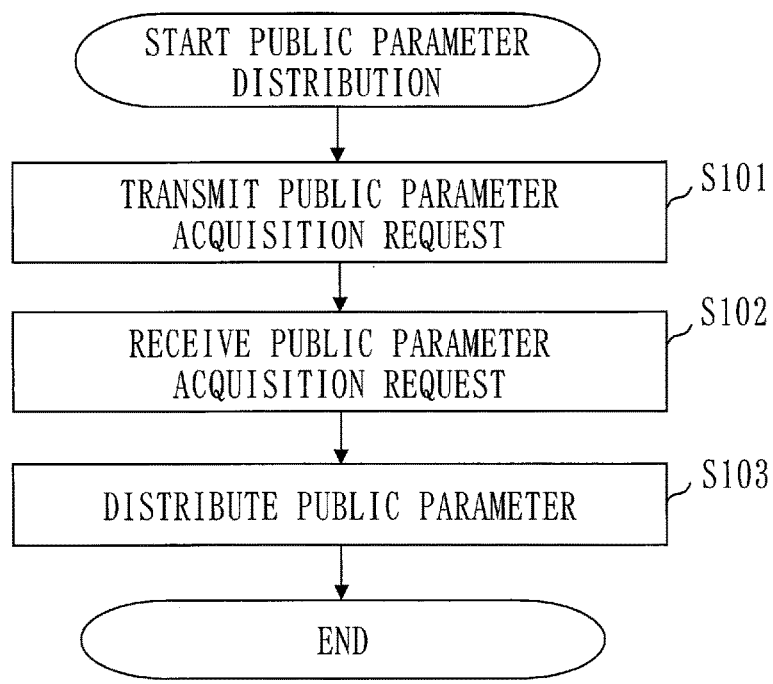
FIG. 14 is a flowchart diagram illustrating an example of distribution processing of a public parameter according to the first embodiment.

FIG. 14 is a flowchart illustrating distribution processing of the public parameter 1003.

The procedure illustrated in FIG. 14 corresponds to FIG. 7.

First, in a step S101, a user terminal apparatus 10 transmits a public parameter acquisition request 4003 to the public parameter issuance unit 403 in the key generation apparatus 40.

Next, in a step S102, the public parameter issuance unit 403 in the key generation apparatus 40 receives the public parameter acquisition request 4003.

Further, the public parameter issuance unit 403 retrieves a master public key 4001 corresponding to the public parameter acquisition request 4003 that has been received from the user terminal apparatus 10, from the master key storage unit 402.

Further, in a step S103, the public parameter issuance unit 403 generates the public parameter 1003 by applying a digital signature to the master public key 4001, and returns the public parameter 1003 to the user terminal apparatus 10.

A series of these operations are, in a case of using HTTP, for example, operations of downloading the public parameter 1003 to the user terminal apparatus 10 when a public parameter acquisition URL is accessed from the user terminal apparatus 10.

Figure 15:
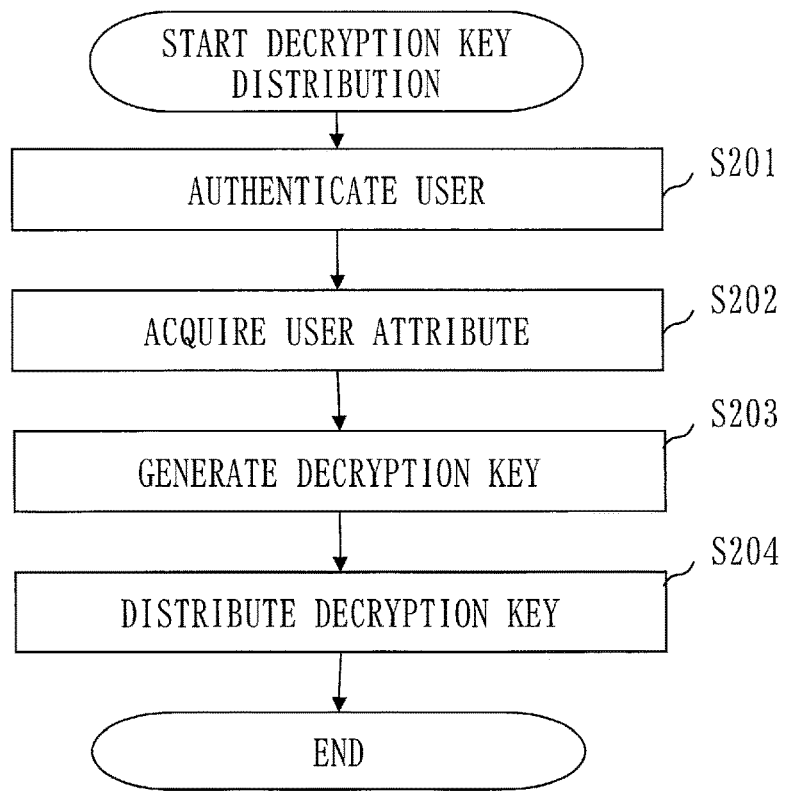
FIG. 15 is a flowchart diagram illustrating an example of distribution processing of a decryption key according to the first embodiment.

FIG. 15 is a flowchart illustrating distribution processing of the decryption keys 1005.

The procedure described in FIG. 15 corresponds to FIG. 8.

First, in a step S201, the user authentication unit 404 in the key generation apparatus 40 performs user authentication.

Specifically, a user terminal apparatus 10 transmits a user ID 4004 to the key generation apparatus 40, first.

Next, the user authentication unit 404 in the key generation apparatus 40 receives the user ID 4004.

Then, the user authentication unit 404 verifies identity of a user who has transmitted the user ID 4004.

The verification method may be use of an electronic certificate, or use of a password.

The user authentication unit 404 transfers the user ID 4004 to the user attribute acquisition unit 405 if authentication of the user ID 4004 succeeds.

Next, in a step S202, the user attribute acquisition unit 405 in the key generation apparatus 40 acquires a user attribute.

Specifically, the user attribute acquisition unit 405 in the key generation apparatus 40 transmits the user ID 4004 to the user attribute search unit 502 in the user information management apparatus 50.

Next, the user attribute search unit 502 searches for a user attribute 2001 corresponding to the user ID 4004 taking the received user ID 4004 as a key, in the attribute information storage unit 501.

Then, the user attribute search unit 502 returns the user attribute 2001 acquired to the user attribute acquisition unit 405 in the key generation apparatus 40.

The information indicated in FIG. 16 is stored in the user information management apparatus 50, for example.

When the user information management apparatus 50 receives "1003" from the key generation apparatus 40 as the user ID 4004, the user attribute search unit 502 in the user information management apparatus 50 returns a user attribute 2001 of "user ID=1003, name=Kenichi Suzuki, department=accounting department, section=NULL, post=department manager" to the user attribute acquisition unit 405 in the key generation apparatus 40.

The user attribute acquisition unit 405 transfers the user attribute 2001 acquired from the user information management apparatus 50 to the decryption key generation unit 406.

Next, in a step S203, the decryption key generation unit 406 in the key generation apparatus 40 generates a decryption key 1005 from the user attribute 2001 acquired from the user information management apparatus 50 and the master secret key 4002 stored in the master key storage unit 402.

Finally, in a step S204, the decryption key generation unit 406 in the key generation apparatus 40 returns the decryption key 1005 generated, to the user terminal apparatus 10.

Now, while an example is described here wherein the user terminal apparatus 10 acquires the decryption key 1005 from the key generation apparatus 40, the administrator of the file encryption system 1 may generate the decryption keys 1005 of all the users collectively by using the key generation apparatus 40, and distribute the decryption keys 1005 of all the users.

<Encryption Processing>

Next, encryption processing of data in the present embodiment will be described.

Figure 17:
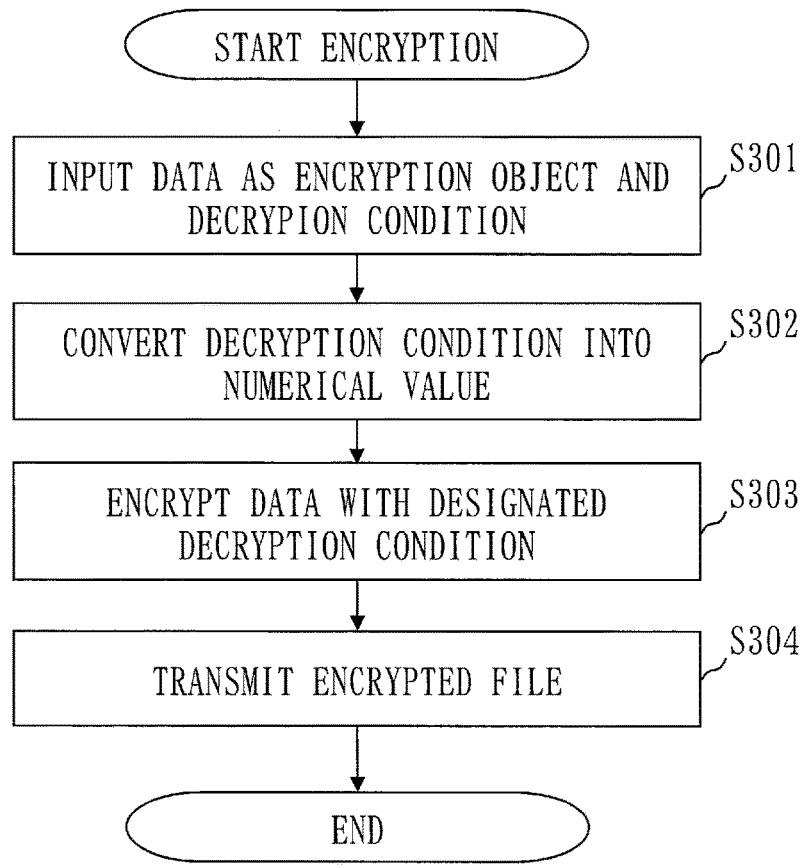
FIG. 17 is a flowchart diagram illustrating an example of encryption processing according to the first embodiment.

FIG. 17 is a flowchart illustrating encryption processing of data.

The procedure illustrated in FIG. 17 corresponds to FIG. 2.

First, in a step S301, a user designates data 1001 as an encryption object and a decryption condition 1002 using the file input unit 101 in the user terminal apparatus 10.

The decryption condition 1002 may be designated, for example, in a text format by a user, or may be designated beforehand.

The file input unit 101 transfers the data 1001 and the decryption condition 1002 input by the user, to the encryption unit 102.

Next, in a step S302, the encryption unit 102 converts the received decryption condition 1002 from a character string to a numeric format using the decryption condition conversion unit 107.

Next, in a step S303, the encryption unit 102 encrypts the data 1001 with the decryption condition 1002 designated by the user.

Specifically, the encryption unit 102 retrieves the public parameter 1003 stored in the key storage unit 103.

Further, the encryption unit 102 encrypts the data 1001 so that a user who matches the decryption condition 1002 can decrypt the data 1001 with the decryption condition 1002, and the public parameter 1003 retrieved from the key storage unit 103.

Additionally, the encryption unit 102 generates an encrypted file 1004 from the encrypted data 1021, which is the data 1001 that has been encrypted, and the decryption condition 1002.

Then, the encryption unit 102 transfers the encrypted file 1004 generated to the encrypted data transmitting unit 104.

As described above, due to encryption by the encryption unit 102, the content of the decryption condition 1002 is embedded in the encrypted data 1021 as the embedded decryption condition.

The encrypted data transmitting unit 104 transmits the encrypted file 1004 to the data storage apparatus 20.

The data storage apparatus 20 receives the encrypted file 1004 at the encrypted data receiving unit 201.

The encrypted data receiving unit 201 transfers the encrypted file 1004 received to the data storage unit 202.

The data storage unit 202 stores the encrypted file 1004.

<Decryption Processing>

Next, decryption processing of a file in the present embodiment will be described.

Figure 18:
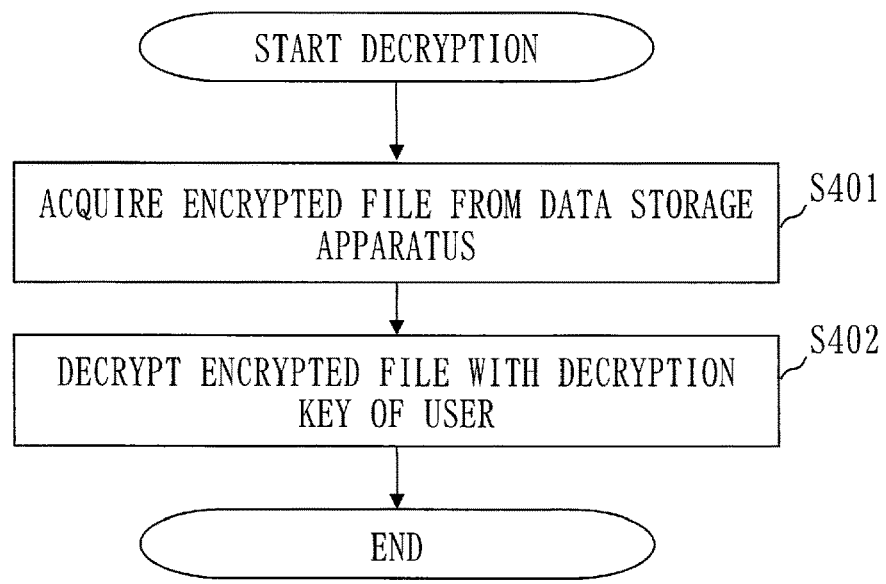
FIG. 18 is a flowchart diagram illustrating an example of decryption processing according to the first embodiment.

FIG. 18 is a flowchart illustrating decryption processing of the file.

The procedure illustrated in FIG. 18 corresponds to FIG. 2.

First, in a step S401, the encrypted data receiving unit 105 in the user terminal apparatus 10 acquires an encrypted file 1004 from the data storage apparatus 20.

Specifically, a user downloads the encrypted file 1004 which the user desires to decrypt from the data storage apparatus 20 first.

As a method to download the encrypted file 1004, a file sharing protocol such as Server Message Block (SMB) or Common Internet File System (CIFS) may be used, or a protocol being an extension of HTTP, such as Web-based Distributed Authoring and Versioning (WebDAV) may be used.

In the data storage apparatus 20, the encrypted data transmitting unit 203 retrieves the encrypted file 1004 from the data storage unit 202 according to a request from the user.

Then, the encrypted data transmitting unit 203 transmits the encrypted file 1004 to the user terminal apparatus 10.

In the user terminal apparatus 10, the encrypted data receiving unit 105 receives the encrypted file 1004, and transfers the encrypted file 1004 to the decryption unit 106.

Next, in a step S402, the decryption unit 106 in the user terminal apparatus 10 decrypts the encrypted file 1004 using a decryption key of the user.

Specifically, the decryption unit 106 retrieves a decryption key 1005 stored in the key storage unit 103.

Then, the decryption unit 106 decrypts the encrypted file 1004 received from the encrypted data receiving unit 105 using the decryption key 1005 retrieved.

If the user attribute 2001 of the decryption key 1005 matches the decryption condition 1002 set for the encrypted file 1004, the data 1001 is acquired as a decryption result.

If it does not match, decryption fails, and the user cannot acquire any information pertaining to the data 1001.

<Personnel Transfer Handling Processing>

Next, an updating method of an encrypted file in a case of occurrence of personnel transfer will be described.

FIG. 19 illustrates an example of events related to personnel transfer.

Although personnel transfer events that actually occur may not be limited to this, personnel transfer events actually occur can be represented by combining the events described below.

There are personnel transfer events that are roughly related to "individual persons" and related to a "group."

As the events related to individual persons, there are "joining a group," "separation from a group," and "transfer between groups."

Further, each event is divided into events for which restoration of a decryption condition is necessary, and for which restoration is not necessary.

As the events for which restoration of a decryption condition is necessary, for example, there are "reinstatement" and "dissolution of hosting an assigned employee" etc., in events for joining a group.

In the case of reinstatement, restoration of the decryption condition to that before reinstatement may become necessary.

Further, in the case of dissolution of hosting an assigned employee, restoration of the decryption condition to that before secondment may become necessary.

These events can be regarded as "temporary revocation" since access to an encrypted file is revoked temporarily and the revocation is to be canceled afterward.

Conversely, in the case of personnel transfer events such as "joining a company" and "employment transfer," restoration of the decryption condition is unnecessary since there is no need to consider return to the original post.

Similarly, personnel transfer events, such as a separation event from a group or transfer between groups, can be also classified by whether restoration of a decryption condition is involved.

In the events concerning a group, there are "generation of a group," "removal of a group" and "change of a group."

The difference to the events concerning individual persons is that restoration of decryption conditions is unnecessary.

A person generally owns the property right of data, and in a case of a group, there is no concept itself of the restoration of decryption conditions (concerning the group).

A pivotal point of handling encrypted files at the time a personnel transfer event occurs is a method to realize "revocation" processing.

There are two types of methods to realize revocation: (1) changing decryption keys, and (2) changing encrypted files.

As an example for the method (1) above, there is a digital signature system using RSA (registered trademark) encryption.

In the digital signature system, a key is re-created and re-distributed when a key for signature (secret key) leaks or validity of a key expires.

In this manner, data signed with an old key cannot be verified, and it becomes possible to realize "revocation."

In a case wherein the method is simply applied to the file encryption system 1, even when a key of a user as a subject of "revocation" is updated, if a key before revocation cannot be collected due to leakage or loss of the key, there is a concern that encrypted files may be decrypted (in the digital signature system, verification of a signature with an old key fails since the latest public key is downloaded from a reliable server to verify signatures).

Therefore, it is necessary to re-encrypt encrypted files simultaneously, which is a heavy burden to both the users and the administrator.

In the present embodiment, by realizing "revocation" only in the method (2) above without performing the method (1) above, the burden on both the users and the administrator can be reduced.

Further, by performing the processing of (2) above in an encrypted state, the contents of the files are not exposed even once; thus, it is possible to handle personnel transfer events more safely.

In the following, a description is made by focusing on changing of an encrypted file.

In FIG. 20, how to handle a decryption key for each personnel event is illustrated.

In a case where description about a decryption key is omitted, the decryption key is handled as in FIG. 20.

In the present embodiment, when a personnel transfer event occurs, the "revocation processing" and the "restoration processing of decryption conditions" are performed to encrypted files while the encrypted files remain encrypted.

In the following, the "revocation processing" and the "restoration processing of decryption conditions" performed at the time of personnel transfer will be first described, and then handling methods for each personnel transfer event will be described.

(1) Revocation Processing

A method to perform the revocation processing while the encrypted files 1004 remain encrypted will be described.

Specifically, the revocation processing unit 209 in the data storage apparatus 20 adds the revocation information "AND NOT [ID of a revoked user] to a decryption condition 1002 while an encrypted file 1004 remains encrypted.

Now, an example of adding the revocation information to the decryption condition 1002 for the encrypted file 1004 that has been encrypted in the functional encryption scheme of Patent Literature 2 is described.

Here, a method to be described below can be applied to encrypted files that have been encrypted in a functional encryption scheme similar to that of Patent Literature 2, i.e., an encryption scheme using basis vectors.

In the functional encryption of Patent Literature 2, a master key is represented by a plurality of basis vectors on dual pairing vector spaces.

Taking advantage of this nature, by executing an operation of a random matrix for the basis vectors, the same transformation as generating a new master key can be executed.

Further, transform of the basis vectors can be also applied to ciphertexts, and updating of ciphertexts can be accomplished while the ciphertexts remain encrypted.

That is, when the encrypted data receiving unit 201 in the data storage apparatus 20 receives an encrypted file 1004 encrypted in the functional encryption of Patent Literature 2 (an encrypted file 1004 encrypted in an encryption scheme using basis vectors), the revocation processing unit 209 generates a basis vector corresponding to revocation information, and adds the revocation information to an embedded decryption condition while the encrypted file 1004 remains in an encrypted state.

More specifically, the revocation processing unit 209 changes a span program of the embedded decryption condition corresponding to addition of the revocation information.

Further, the revocation processing unit 209 generates a ciphertext element corresponding to the revocation information, based on a share according to secret sharing of a user attribute of a decryption-permission user and on a user attribute of a revoked user.

Furthermore, the revocation processing unit 209 adds a ciphertext element corresponding to the revocation information to the ciphertext element corresponding to the user attribute of the decryption-permission user.

Figure 35:
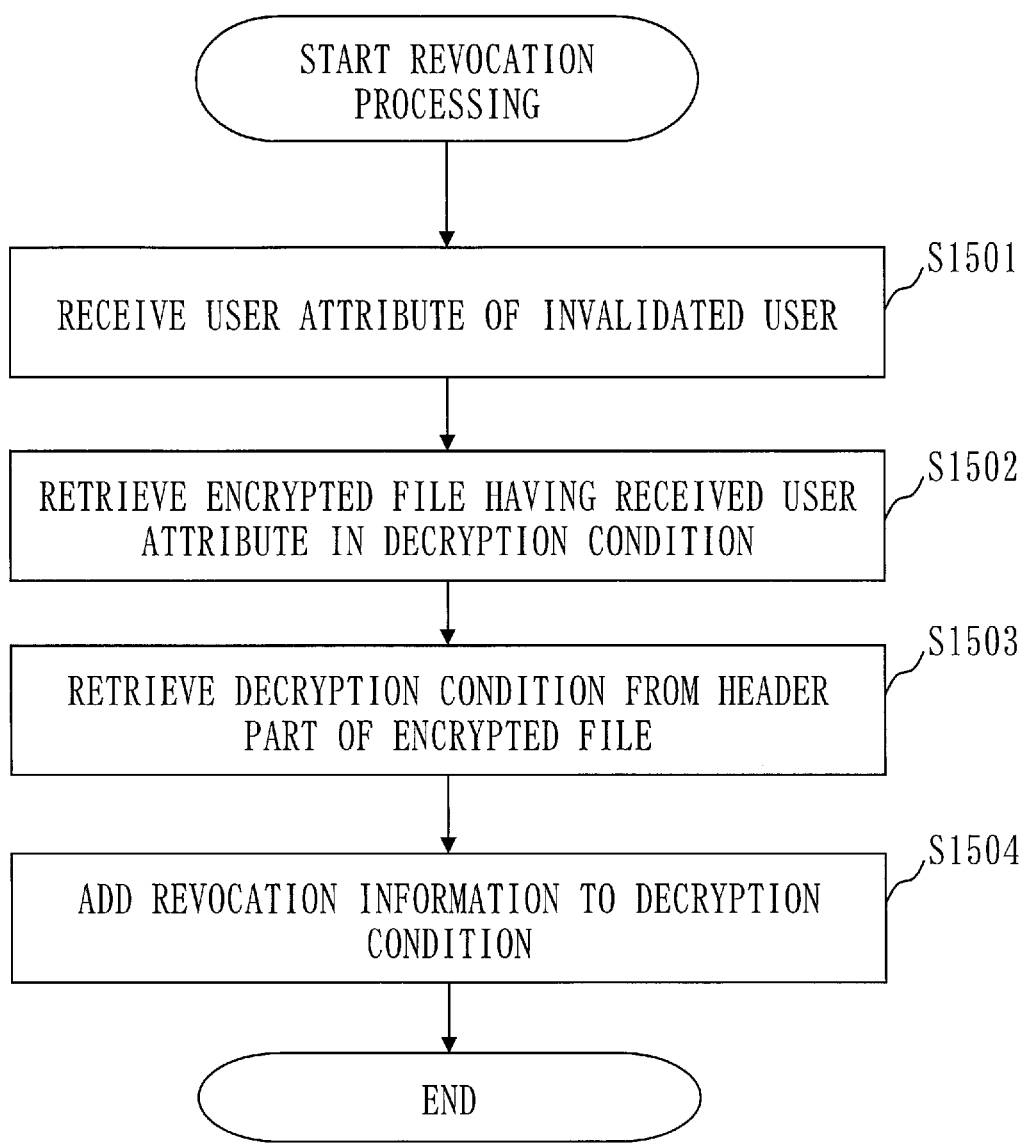
FIG. 35 is a flowchart diagram illustrating an example of revocation processing according to the first embodiment.

FIG. 35 is a flowchart illustrating an example of operations of the revocation processing unit 209.

In the following, the example of the operations of the revocation processing unit 209 will be described with reference to the flowchart of FIG. 35.

First, in a step S1501, the revocation processing unit 209 receives a user attribute 2001 of a revoked user from the personnel transfer event processing unit 207.

Next, in a step S1502, the revocation processing unit 209 retrieves the encrypted file 1004 wherein the user attribute 2001 received in the step S1501 is included in the decryption condition 1002.

Specifically, the revocation processing unit 209 transfers the user attribute 2001 received in the step S1501 to the file extraction unit 205.

Then, the file extraction unit 205 returns the encrypted file 1004 wherein the user attribute 2001 received from the revocation processing unit 209 is included in the decryption condition 1002 to the revocation processing unit 209.

Next, in a step S1503, the revocation processing unit 209 retrieves the decryption condition 1002 from the header part 1004a of the encrypted file 1004 received form the file extraction unit 205.

Here, in the step S1502 and the step S1503, the file extraction unit 205 returns the encrypted file 1004 to the revocation processing unit 209, and the revocation processing unit 209 retrieves the decryption condition 1002 from the header part 1004a of the encrypted file 1004.

Instead, the file extraction unit 205 may retrieve the decryption condition 1002 from the header part 1004a of the encrypted file 1004 and return the decryption condition 1002 retrieved to the revocation processing unit 209.

Next, in a step S1504, the revocation processing unit 209 adds the revocation information to the decryption condition 1002 retrieved as follows.

decryption condition: "department=general affairs department AND section=general affairs section"

revocation information: "AND NOT ID=1001"

Further, in a step S1504, the revocation processing unit 209 adds the revocation information to the embedded decryption condition in the encrypted data 1021 of the data part 1004b in the encrypted file 1004 retrieved, as with the decryption condition 1002, as follows.

decryption condition: "department=general affairs department AND section=general affairs section"

revocation information: "AND NOT ID=1001"

A ciphertext in a functional encryption is roughly composed of a span program M and a ciphertext element $c_i$ (for the precise formulae, see Patent Literature 2).

Further, the embedded decryption condition is composed of an attribute type t and an attribute value v.

t is an integral value denoting types of attributes, and a unique number is assigned for each attribute type.

The attribute types are expressed as $t_1, t_2, \ldots$ in the order of the attribute types appear in the embedded decryption condition.

v is a vector value denoting values of attributes, and a unique vector value is assigned for each value.

The attribute values are expressed as $v_1, v_2, \ldots$ in the order of the attribute values appear in the embedded decryption condition.

The attribute value v is supposed to be expressed with → above v; however, due to limitations of notation, it is expressed as v.

In the present description, an expression of v and an expression of v on the top of which → is added are the same.

The decryption condition: "department=general affairs department AND section=general affairs section" is, in the embedded decryption condition, expressed as follows.

$$\text{department: } =t_1, \text{ general affairs department: } =\vec{v}_1$$
$$\text{section: } =t_2, \text{ general affairs section: } =\vec{v}_2 \quad \text{[Formula 1]}$$

Further, the span program is expressed as follows.

$$M = \begin{pmatrix} 1 & 0 \\ 0 & 1 \end{pmatrix}$$ [Formula 2]

The first row of the span program corresponds to "department=general affairs department" and the second row corresponds to "section=general affairs section," respectively.

The elements $c_1$ and $c_2$ of the ciphertext correspond to each row of the span program.

Thus, the decryption condition: "department=general affairs department AND section=general affairs section" is turned into, in the embedded decryption condition, ciphertexts as follows.

$$c_1 = s_1 \vec{e}_{t,1} + \theta_1 \vec{v}_1$$

$$c_2 = s_2 \vec{e}_{t,2} + \theta_2 \vec{v}_2$$ [Formula 3]

$\vec{e}_{t,j}$=vector, the j-th of which is 1, with a length of $n_t$ (basis vector)

$\theta_i$=random number $s_i$=share of secret sharing, having a relation of $s_0 = s_1 \times s_2 \ldots$ In a case of adding the revocation information: "AND NOT ID=1001" to the above ciphertexts, the revocation processing unit 209 first changes the span program M as follows.

$$M = \begin{pmatrix} 1 & 0 & 0 \\ 0 & 1 & 0 \\ 0 & 0 & 1 \end{pmatrix}$$ [Formula 4]

Next, the revocation processing unit 209 calculates a ciphertext element $c_3$ corresponding to the third row of the span program changed.

Since "NOT ID=1001" is a NOT condition, $c_3$ is expressed as follows.

$$c_3 = s_3 \vec{v}_3$$ [Formula 5]

1001:=corresponding to $\vec{v}_3$

As for $s_3$, since $s_0 = s_1 \times s_2$ has only to be $s_0 = s_1 \times s_2 \times s_3$ anew, the revocation processing unit 209 has only to select $s_3$ at random and multiply $s_3$ by $s_0$.

The changed span program M and $c_1$ through $c_3$ compose a ciphertext with a decryption condition of "department=general affairs department AND section=general affairs section AND NOT ID=1001."

In this manner, the revocation processing unit 209 executes the "revocation processing" to add the revocation information "AND NOT ID=[ID of a revoked user]" to the embedded decryption condition while the encrypted file 1004 remains encrypted.

Further, the revocation processing unit 209 adds the revocation information "AND NOT ID=[ID of a revoked user]" also to the decryption condition 1002.

(2) Restoration Processing of Decryption Condition Using Proxy Re-encryption Scheme Next, restoration processing of a decryption condition provided by the decryption condition restoration unit 210 in the data storage apparatus 20 will be described.

The restoration processing of the decryption condition is processing to remove the revocation information from the embedded decryption condition of the encrypted file 1004 whereto the revocation processing has been performed.

Specifically, the decryption condition restoration unit 210 removes the revocation information added by the revocation processing as stated above by using the proxy re-encryption scheme of Non-Patent Literature 2.

Figure 21:
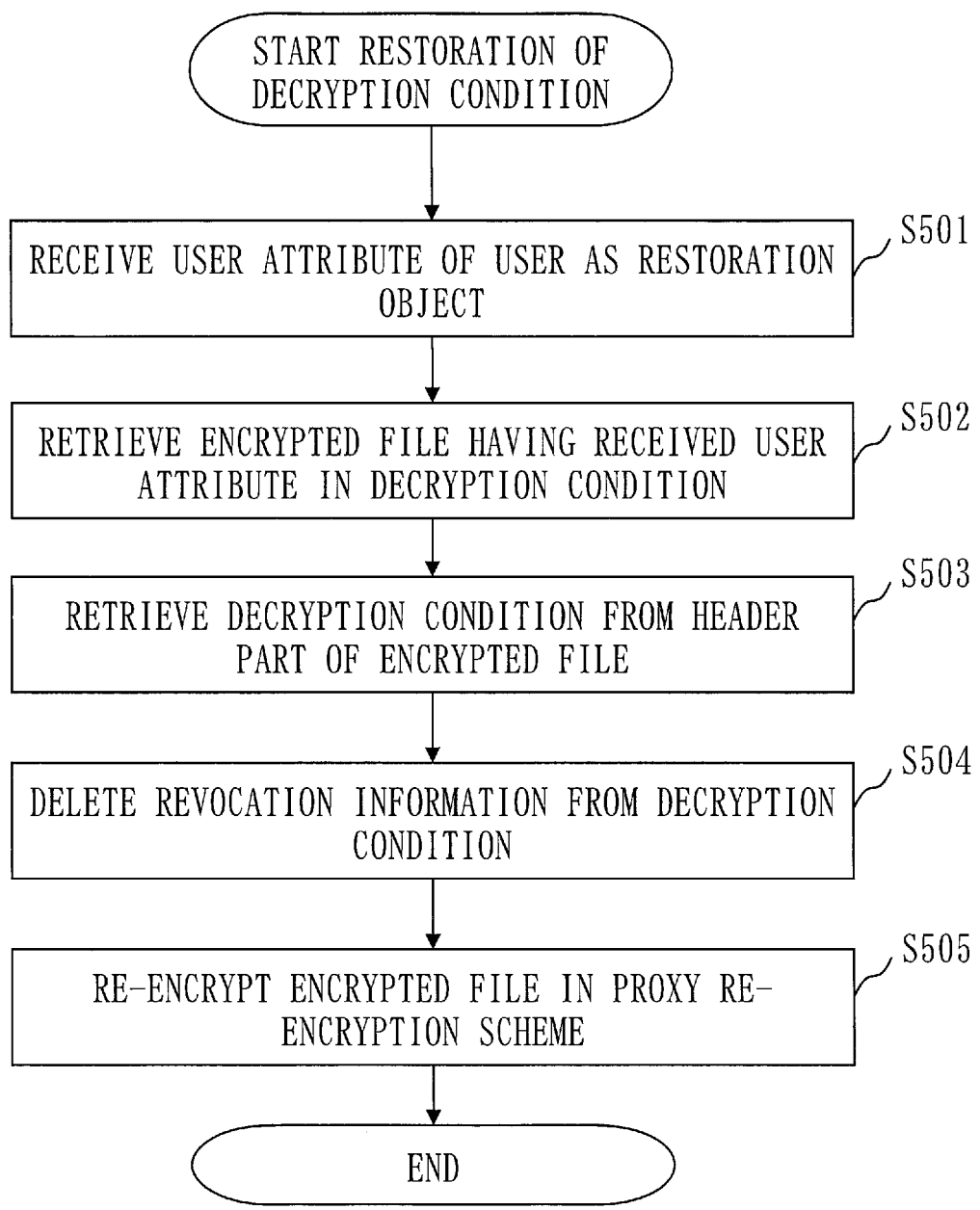
FIG. 21 is a flowchart diagram illustrating an example of restoration processing of a decryption condition according to the first embodiment.

FIG. 21 is a flowchart illustrating a restoration processing procedure of a decryption condition.

In the following, a description is made of an example of removing the part of "AND NOT ID=1001" from the decryption condition "department=general affairs department AND section=general affairs section AND NOT ID=1001" whereto the revocation information has been added, as described above, and changing the decryption condition to a decryption condition "department=general affairs department AND section=general affairs section."

First, in a step S501, the decryption condition restoration unit 210 receives a user attribute 2001 of a user as a restoration object from the personnel transfer event processing unit 207.

For example, the decryption condition restoration unit 210 receives "ID=1001, name=Hiroshi Takahashi, department=personnel department, section=NULL, post=department manager" as the user attribute 2001.

Next, in a step S502, the decryption condition restoration unit 210 retrieves an encrypted file 1004 wherein the user attribute 2001 received in the step S501 is included in the decryption condition 1002.

Specifically, the revocation processing unit 209 transfers the user attribute 2001 received in the step S501 to the file extraction unit 205.

Then, the file extraction unit 205 returns the encrypted file 1004 wherein the user attribute 2001 received from the revocation processing unit 209 is included in the decryption condition 1002 to the decryption condition restoration unit 210.

That is, the file extraction unit 205 returns the encrypted file 1004 wherein the revocation information "AND NOT ID=[ID of a revoked user]" is included in the decryption condition 1002 to the decryption condition restoration unit 210.

For example, when the user attribute 2001 of the revoked user is "ID=1001, name=Hiroshi Takahashi, department=personnel department, section=NULL, post=department manager," the encrypted file 1004 wherein "AND NOT ID=1001" is included in the decryption condition 1002 is retrieved by the file extraction unit 205.

A decryption condition of a file as an extraction object is, for example, "department=general affairs department AND section=general affairs section AND NOT ID=1001."

Next, in a step S503, the decryption condition restoration unit 210 retrieves the decryption condition 1002 from the header part 1004a of the encrypted file 1004 retrieved from the file extraction unit 205.

Here, in the steps S502 and S503, the file extraction unit 205 returns the encrypted file 1004 to the decryption condition restoration unit 210, and the decryption condition restoration unit 210 retrieves the decryption condition 1002 from the header part 1004a of the encrypted file 1004.

Instead, the file extraction unit 205 may retrieve the decryption condition 1002 from the header part 1004a of the encrypted file 1004 and return the decryption condition 1002 retrieved to the decryption condition restoration unit 210.

Next, in a step S504, the decryption condition restoration unit 210 removes the revocation information "AND NOT ID=[ID of a revoked user] from the decryption condition 1002 and generates a re-encryption condition 4005.

For example, in a step S503, when a decryption condition "department=general affairs department AND section=general affairs section AND NOT ID=1001" is retrieved, "department=general affairs department AND section=general affairs section" becomes the re-encryption condition 4005.

Next, in a step S505, the decryption condition restoration unit 210 re-encrypts an encrypted file 1004 in a proxy re-encryption scheme.

Specifically, the decryption condition restoration unit 210 retrieves the encrypted data 1021 from the data part 1004b of the encrypted file 1004, and generates a re-encryption request 6001 (FIG. 11) from the encrypted data 1021 retrieved and the re-encryption condition 4005.

Then, the decryption condition restoration unit 210 transmits the re-encryption request 6001 to the re-encryption apparatus 60 (FIG. 10).

Further, the decryption condition restoration unit 210 receives the encrypted file 1004 re-encrypted in the proxy re-encryption scheme (for example, Non-Patent Literature 2) from the re-encryption apparatus 60 (FIG. 10).

For example, when the re-encryption condition 4005 is "department=general affairs department AND section=general affairs section," the decryption condition restoration unit 210 receives the encrypted file 1004 including the decryption condition 1002 as "department=general affairs department AND section=general affairs section" in the header part 1004a, and including the encrypted data 1021 re-encrypted with the decryption condition "department=general affairs department AND section=general affairs section" in the data part 1004b.

An example of operations of the re-encryption apparatus 60 at the time of receiving a re-encryption request 6001 is as follows.

In the re-encryption apparatus 60, the re-encryption unit 602 receives a re-encryption request 6001 (FIG. 10).

Then, the re-encryption unit 602 transfers the re-encryption request 6001 to the re-encryption key acquisition unit 601.

The re-encryption key acquisition unit 601 retrieves a re-encryption condition 4005 from the re-encryption request 6001, and transfers the re-encryption condition 4005 to the key generation apparatus 40 (FIG. 9).

In the key generation apparatus 40, the re-encryption key generation unit 407 receives the re-encryption condition 4005 and generates a re-encryption key 4006 (FIG. 9).

Then, the re-encryption key generation unit 407 transmits the re-encryption key 4006 to the re-encryption key acquisition unit 601 in the re-encryption apparatus 60 (FIG. 9).

The re-encryption key acquisition unit 601 receives the re-encryption key 4006, and transfers the re-encryption key 4006 to the re-encryption unit 602 (FIG. 10).

The re-encryption unit 602 re-encrypts encrypted data 1021 included in a data part 1004b of an encrypted file 1004, being included in the re-encryption request 6001 with the re-encryption key 4006 in the scheme of Non-Patent Literature 2 (FIG. 10).

Further, the re-encryption unit 602 stores the re-encryption condition 4005 in a header part 1004, and the encrypted data 1021 that has been re-encrypted in the data part 1004b, to newly generate an encrypted file 1004 re-encrypted (FIG. 10).

Then, the re-encryption unit 602 transmits the encrypted file 1004 re-encrypted to the data storage apparatus 20 (FIG. 10).

Re-encryption by the re-encryption apparatus 60 corresponds to processing of removing revocation information "AND NOT ID=[ID of a revoked user] from an embedded decryption condition inside the encrypted data 1021.

In the following description, restoration processing of a decryption condition in a proxy re-encryption scheme is simply called "restoration processing."

In what follows, procedures to handle personnel transfer events using the "revocation processing" and the "restoration processing" will be described.

First, personnel transfer events related to individual persons will be described.

There are three types of personnel transfer events related to individual persons: joining a group (for example, a gathering of people in "department" or "section" in an organization), separation from a group, and transfer between groups.

(A) Individual Persons—Joining Group

Figure 22:
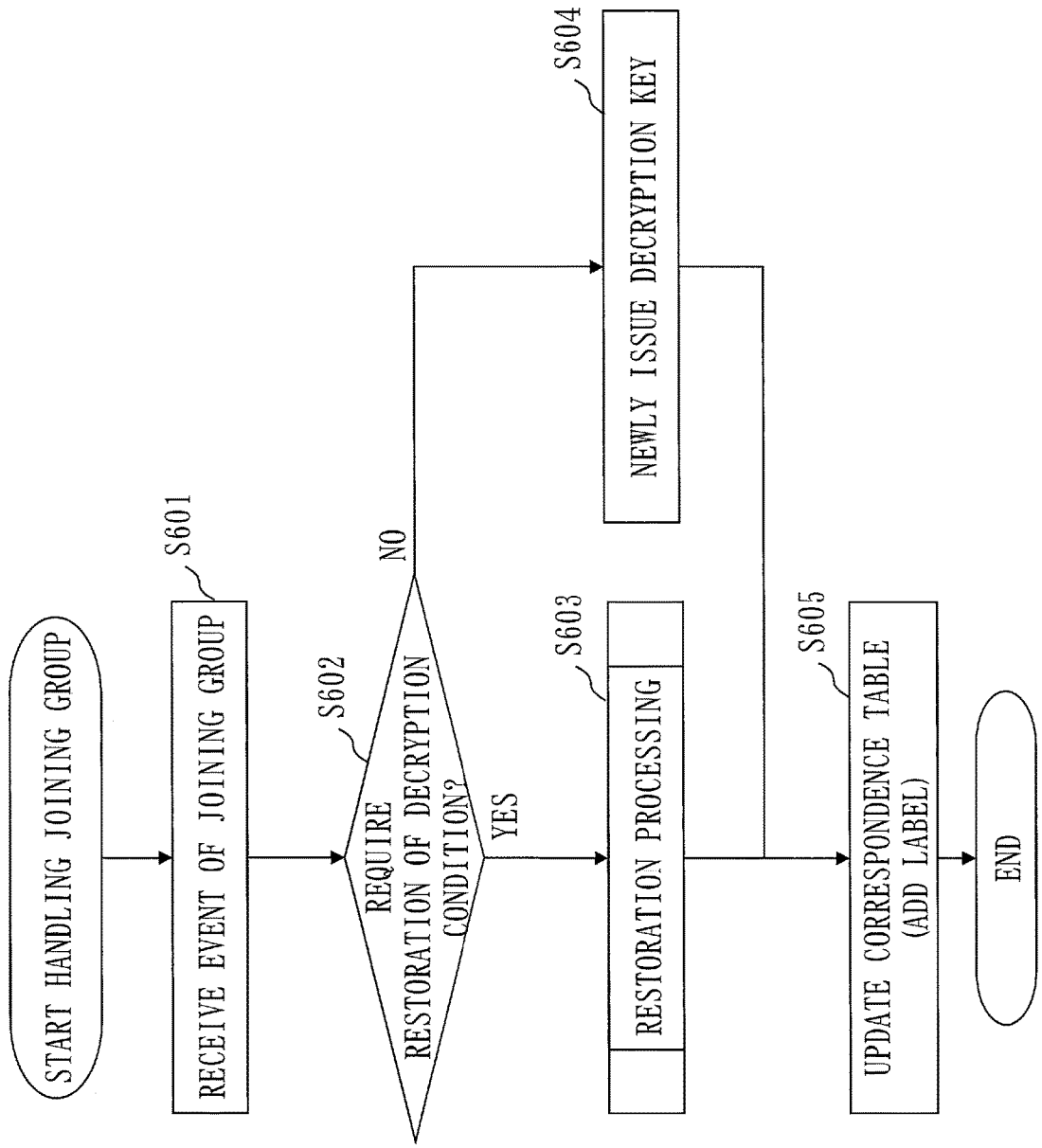
FIG. 22 is a flowchart diagram illustrating an example of processing at the time when an individual person joins a group according to the first embodiment.

FIG. 22 is a flowchart illustrating a procedure to handle an event of joining a group.

First, in a step S601, the personnel transfer event inputting unit 206 receives personnel transfer information 2003, and the personnel transfer event inputting unit 206 transfers the personnel transfer information 2003 to the personnel transfer event processing unit 207.

Next, in a step S602, the personnel transfer event processing unit 207 determines whether a personnel transfer event indicated in the personnel transfer information 2003 is an event which requires restoration of decryption conditions.

Specifically, as in an example illustrated in FIG. 19, the personnel transfer event processing unit 207 determines that restoration of the decryption conditions is necessary in a case of such an event as "reinstatement" or "dissolution of hosting an assigned employee."

In a case of another event such as "joining a company" or "employment transfer," etc., for example, the personnel transfer event processing unit 207 determines that restoration for the event is unnecessary.

Here, it is assumed that a determination is made of whether the event requires restoration of the decryption conditions by the personnel transfer event processing unit 207; however, the determination may be made by an entry operator who enters the personnel transfer information 2003.

When the personnel transfer event indicated in the personnel transfer information 2003 is an event which requires restoration of the decryption conditions (YES in the step S602), the procedure proceeds to a step S603, and restoration processing is performed.

The restoration processing is as stated above precisely.

For example, when the personnel transfer information 2003 in the first line of FIG. 6 is received, since the personnel transfer event indicated in the first line of FIG. 6 is a "reinstatement" event which requires restoration of the decryption condition, the restoration processing is performed in the step S603.

Here, the user attribute 2001 as an object of the restoration processing is "ID=1002, name=Tomoko Kobayashi, department=accounting department, section=budget section, post=contact" indicated in "new attribute."

When the personnel transfer event indicated in the personnel transfer information 2003 is an event which does not require restoration of the decryption conditions (NO in the step S602), the personnel transfer event processing unit 207 does nothing, and to a user newly joins, a decryption key 1005 corresponding to a user attribute 2001 of the user is distributed from the key generation apparatus 40 (step S604).

Next, regardless of presence or absence of restoration of the decryption conditions, in a step S605, the personnel transfer event processing unit 207 adds a numerical conversion rule corresponding to a user attribute 2001 newly joins a group, to the correspondence table (FIG. 4) retained by the attribute conversion unit 208, as needed.

Similarly, the decryption condition conversion units 107 in the user terminal apparatuses 10 also change the correspondence tables retained by the decryption condition conversion units 107.

(B) Individual Persons—Separation From Group

Figure 23:
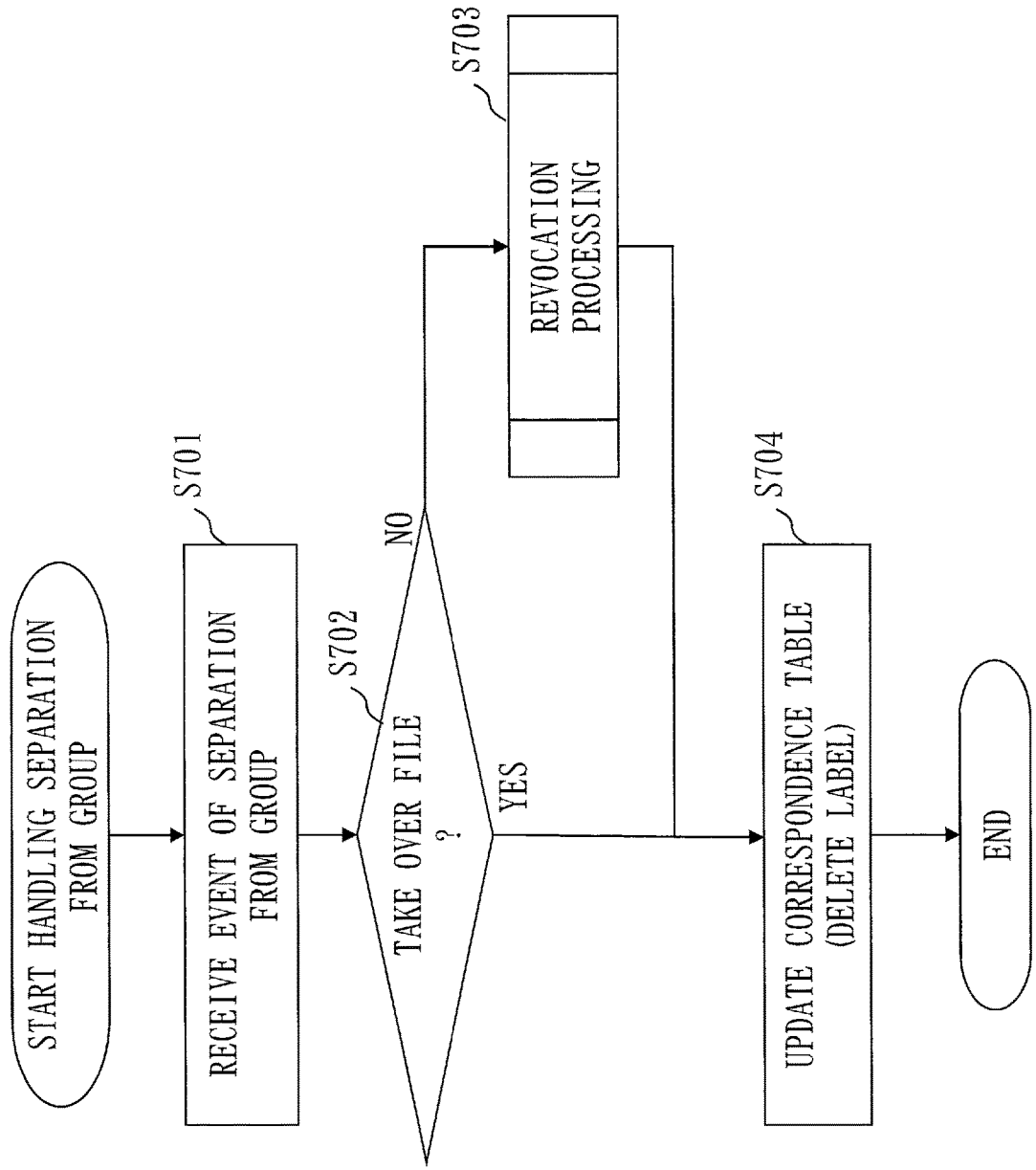
FIG. 23 is a flowchart diagram illustrating an example of processing at the time when an individual person leaves a group according to the first embodiment.

FIG. 23 is a flowchart illustrating a procedure to handle an event of separation from a group.

First, in a step S701, when the personnel transfer event inputting unit 206 receives personnel transfer information 2003, the personnel transfer event inputting unit 206 transfers the personnel transfer information 2003 to the personnel transfer event processing unit 207.

Next, in a step S702, when the personnel transfer event processing unit 207 receives an event of separation from a group (for example, retirement, employment transfer, secondment, temporary retirement, etc.), the personnel transfer event processing unit 207 determines whether takeover of files is involved or not.

Takeover of file means processing of taking over an encrypted file which has been available for decryption before secondment or employment transfer and making the encrypted file successively available at a place of loan or a place whereto a person is transferred permanently.

If there is no takeover of file involved (NO in the step S702), the revocation processing is performed in a step S703.

The revocation processing is as described above in detail.

For example, when the personnel transfer information 2003 in the second line of FIG. 6 is received, since the personnel transfer event indicated in the second line of FIG. 6 is a "retirement" event, takeover of files is unnecessary, and the revocation processing is performed in the step S703.

That is, the user attribute 2001 for retirement "ID=1004, name=Tetsuya Satou, department=accounting department, section=budget section, post=section manager" is transferred to the revocation processing unit 209, and the revocation processing unit 209 performs the revocation processing.

Meanwhile, if there is takeover of files involved (YES in the step S702), the user as an object of separation continues retaining a decryption key 1005 before separation, and no processing is added to the encrypted file 1004 which has been available for decryption.

Next, regardless of presence or absence of takeover of file, in a step S704, the personnel transfer event processing unit 207 deletes a numerical conversion rule corresponding to the user attribute 2001 separated from the group, from the correspondence table (FIG. 4) retained by the attribute conversion unit 208, as needed.

Here, a numerical conversion rule of a user who has a possibility to join the group again due to an event of reinstatement, etc. may not be deleted from and remain in the correspondence table.

When the correspondence table is changed, the decryption condition conversion units 107 in the user terminal apparatuses 10 also change the correspondence tables retained by the decryption condition conversion units 107.

(C) Individual Persons—Transfer between Groups

Figure 24:
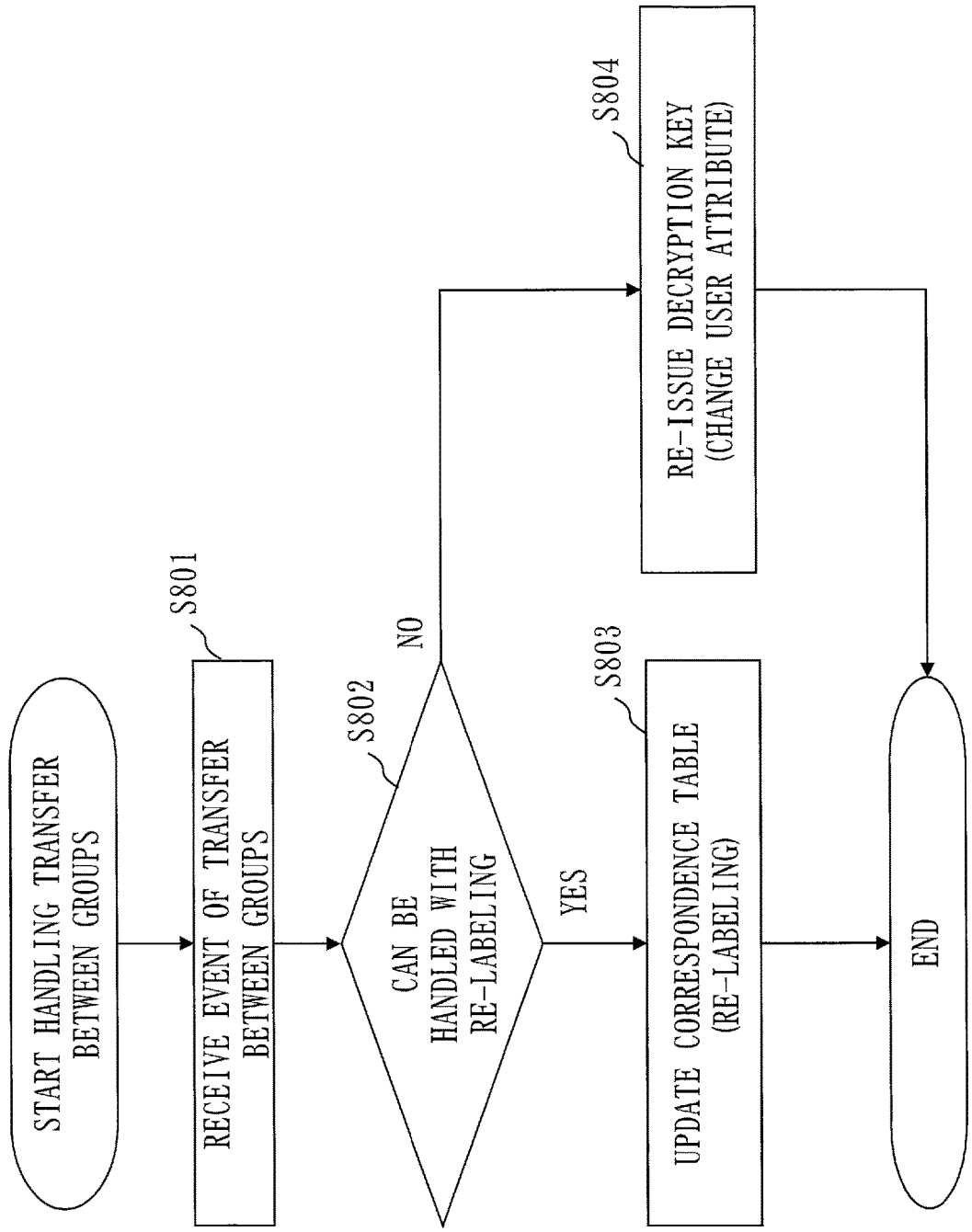
FIG. 24 is a flowchart diagram illustrating an example of processing at the time when an individual person transfers between groups according to the first embodiment.

FIG. 24 is a flowchart illustrating a procedure to handle an event of transfer between groups.

First, in a step S801, when the personnel transfer event inputting unit 206 receives personnel transfer information 2003, the personnel transfer event inputting unit 206 transfers the personnel transfer information 2003 to the personnel transfer event processing unit 207.

Next, in a step S802, when the personnel transfer event processing unit 207 receives an event of transfer between groups (for example, transfer between departments and sections, change of post, change of name, etc.), the personnel transfer event processing unit 207 determines whether the event can be handled only with updating of the correspondence table (FIG. 4) retained by the attribute conversion unit 208.

For example, in a case of changing name, the case can be handled only with updating the correspondence table (FIG. 4) retained by the attribute conversion unit 208. For example, in a case of changing name from "Tomoko Kobayashi" to "Tomoko Saitou," the personnel transfer event processing unit 207 updates the row of "Tomoko Kobayashi" and "102" in FIG. 4 to "Tomoko Saitou" and "102" (step S803).

Here, when the correspondence table is changed, the decryption condition conversion units 107 in the user terminal apparatuses 10 also change the correspondence tables retained by the decryption condition conversion units 107.

If the event cannot be handled only with updating the correspondence table (step S804), in the step S804, the key generation apparatus 40 issues a decryption key 1005 of a new attribute to the user to be transferred.

Next, it will be described handling of entity conversion events.

(A) Group—Generation of Group

Figure 25:
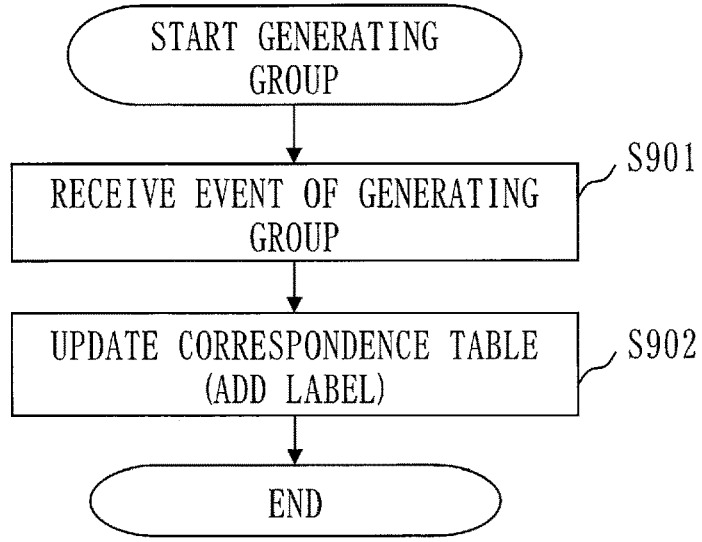
FIG. 25 is a flowchart diagram illustrating an example of processing at the time when a group is generated according to the first embodiment.

FIG. 25 is a flowchart illustrating a procedure to handle an event of generating a group.

First, in a step S901, when the personnel transfer event inputting unit 206 receives personnel transfer information 2003, the personnel transfer event inputting unit 206 transfers the personnel transfer information 2003 to the personnel transfer event processing unit 207.

Next, in a step S902, when the personnel transfer event processing unit 207 receives an event of generating a group (for example, generating a department and a section, generating a new post, etc.), the personnel transfer event processing unit 207 adds a numerical conversion rule of a department, a section, a post, etc. to be newly generated by the event, to the correspondence table (FIG. 4) retained by the attribute conversion unit 208.

Similarly, the decryption condition conversion units 107 in the user terminal apparatuses 10 also add a similar numerical conversion rule to the correspondence tables retained by the decryption condition conversion units 107.

(B) Group—Removal of Group

Figure 26:
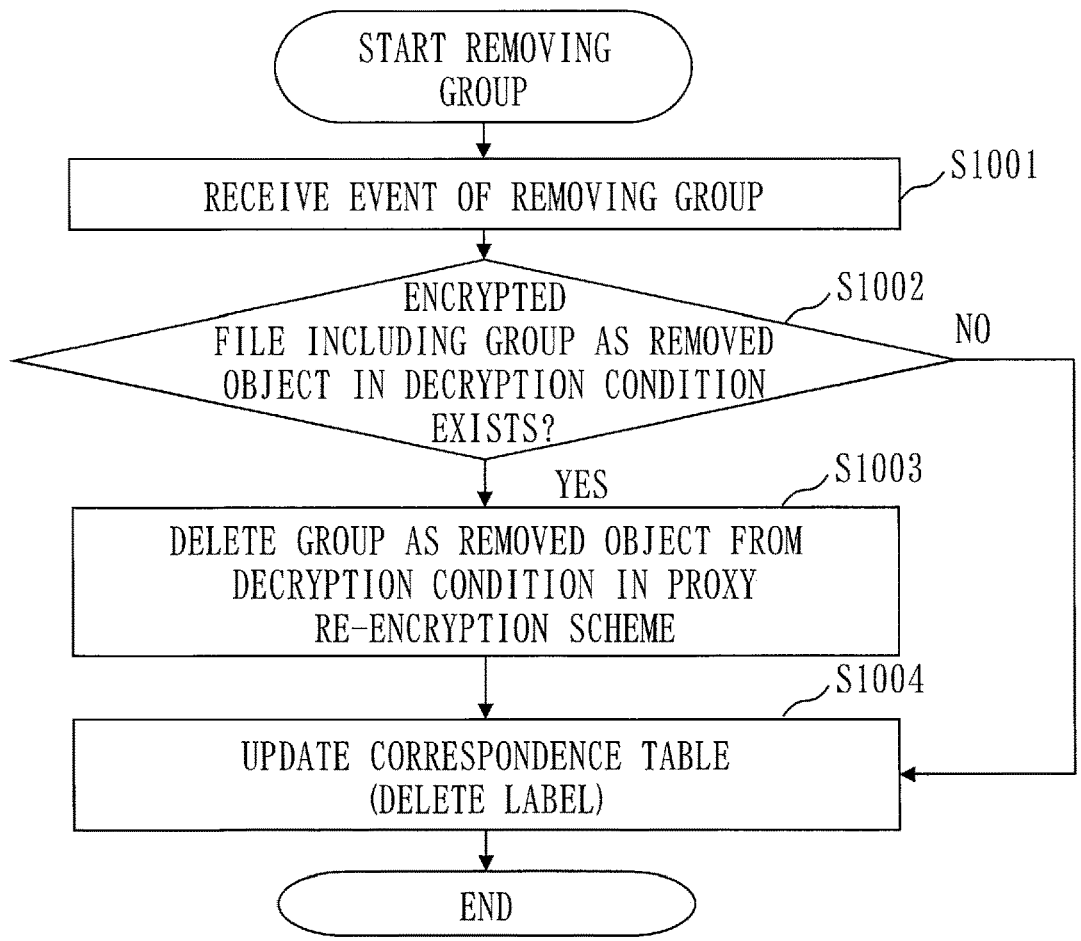
FIG. 26 is a flowchart diagram illustrating an example at the time when a group is removed according to the first embodiment.

FIG. 26 is a flowchart illustrating a procedure to handle an event of removing a group.

First, in a step S1001, when the personnel transfer event inputting unit 206 receives personnel transfer information 2003, the personnel transfer event inputting unit 206 transfers the personnel transfer information 2003 to the personnel transfer event processing unit 207.

Next, in a step S1002, the personnel transfer event processing unit 207 determines whether or not there exists an encrypted file 1004 including the group as an object of removal in a decryption condition.

If there exists the encrypted file 1004 including the group as the object of removal in the decryption condition (YES in the step S1002), the personnel transfer event processing unit 207 deletes a description part of the group as the removed object, from the decryption condition 1002 (S1003).

Further, the decryption condition 1002 wherein the description part of the group as the removed object is deleted is used as a re-encryption condition 4005, and re-encryption is newly carried out in the proxy re-encryption scheme by the re-encryption apparatus 60 (S1003).

For example, assume that there is an encrypted file 1004 having a decryption condition of "department=system department AND section=fourth development section."

Here, when the fourth development section is removed, the personnel transfer event processing unit 207 generates a re-encryption request 6001 having "department=system department" as a re-encryption condition 4005, transmits the re-encryption request 6001 to the re-encryption apparatus 60, and makes the re-encryption apparatus 60 to execute re-encryption of the encrypted file 1004.

Next, in a step S1004, the personnel transfer event processing unit 207 deletes a numerical conversion rule of the removed group from the correspondence table (FIG. 4) retained by the attribute conversion unit 208.

Similarly, the decryption condition conversion units 107 in the user terminal apparatuses 10 also delete a numerical conversion rule from the correspondence tables retained by the decryption condition conversion units 107.

(C) Group—Change of Group

Figure 27:
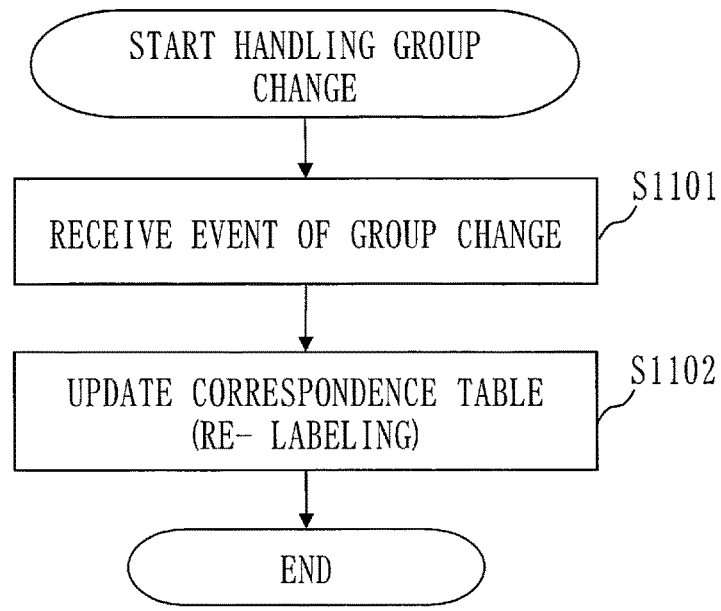
FIG. 27 is a flowchart diagram illustrating an example of processing at the time when a group is changed according to the first embodiment.

FIG. 27 is a flowchart illustrating a procedure to handle events of changing a group.

First, in a step S1101, when the personnel transfer event inputting unit 206 receives personnel transfer information 2003, the personnel transfer event inputting unit 206 transfers the personnel transfer information 2003 to the personnel transfer event processing unit 207.

Next, in a step S1102, the personnel transfer event processing unit 207 updates the correspondence table (FIG. 4) retained by the attribute conversion unit 208 for an event of a change of group (for example, change of a department name and a section name, etc.).

For example, when a name of "budget section" is changed to "section in charge of budget," the personnel transfer event processing unit 207 has only to update the row of "budget section" and "301" in FIG. 4 to "section in charge of budget" and "301" (step S1102).

Thus far is the explanation of the methods to handle basic personnel transfer and entity conversion.

As entity conversion, events such as integration of groups or division of a group may occur besides simple events such as addition of a group, deletion of a group and change of a group.

The following describes methods to handle integration of groups and division of a group.

(D) Group—Integration of Groups

Figure 28:
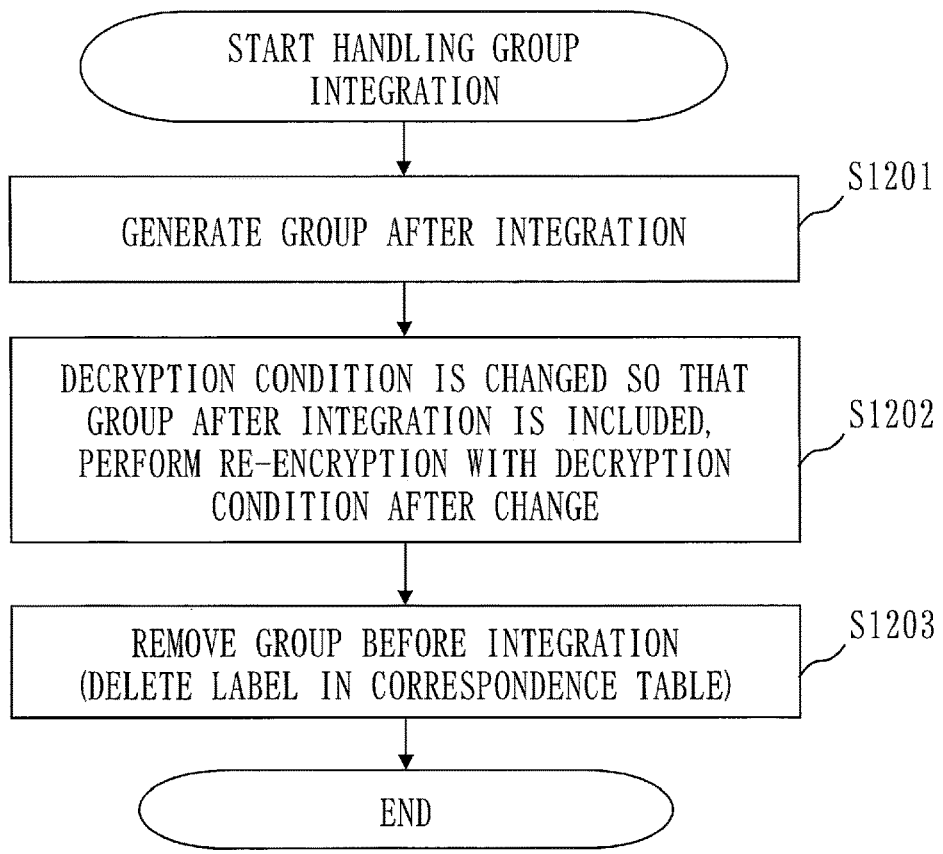
FIG. 28 is a flowchart diagram illustrating an example of processing at the time when groups are merged according to the first embodiment.

FIG. 28 is a flowchart illustrating a procedure to handle an event of group integration.

As changing processing of groups, there is processing of integrating two groups.

The integration processing can be realized by combining two processing of removing processing of a group and generating processing of a group; however, it is more convenient that the integration processing can be instructed as group integration.

Thus, the procedure of integration processing of groups will be described.

Here, the integration of groups is instructed by inputting the personnel transfer information 2003 to the personnel transfer event inputting unit 206.

Now, a description is made based on an example where "department=strategic department" and "section=planning section" are integrated into "department=planning and strategic department."

First, in a step S1201, the personnel transfer event processing unit 207 generates a group after integration.

A generation method of the group is similar to that in the step S902 of FIG. 25.

Next, in a step S1202, the personnel transfer event processing unit 207 changes decryption conditions 1002 for encrypted files 1004, wherein groups before integration are included in the decryption conditions 1002, so as to have the decryption conditions 1002 include the group after integration.

For example, in encrypted files 1004 wherein the decryption conditions 1002 include "department=strategic department" and "department=planning department," the personnel transfer event processing unit 207 change the parts of "department=strategic department" and "department=planning department" in the decryption conditions 1002 to "department=planning and strategic department."

Further, the personnel transfer event processing unit 207 changes a decryption condition 1002 "department=planning department AND post=department manager" to a decryption condition 1002 "department=planning and strategic department AND post=department manager," for example.

Then, the personnel transfer event processing unit 207 generates a re-encryption request 6001 whose re-encryption conditions 4005 are the decryption conditions 1002 after change, transmits the re-encryption request 6001 to the re-encryption apparatus 60, and makes the re-encryption apparatus 60 re-encrypt the encrypted files 1004.

Next, in a step S1203, the personnel transfer event processing unit 207 performs removing processing of groups before integration.

The removing processing of groups is similar to that in the step S1004 of FIG. 26.

In a case of an example where "department=strategic department" and "department=planning department" are integrated into "department=planning and strategic department," the personnel transfer event processing unit 207 deletes a numerical conversion rule of "department=strategic department" and "department=planning department" from the correspondence table (FIG. 4) retained by the attribute conversion unit 208.

Similarly, the decryption condition conversion units 107 in the user terminal apparatuses 10 also delete a numerical conversion rule from the correspondence tables retained by the decryption condition conversion units 107.

(E) Group—Division of Group

Figure 29:
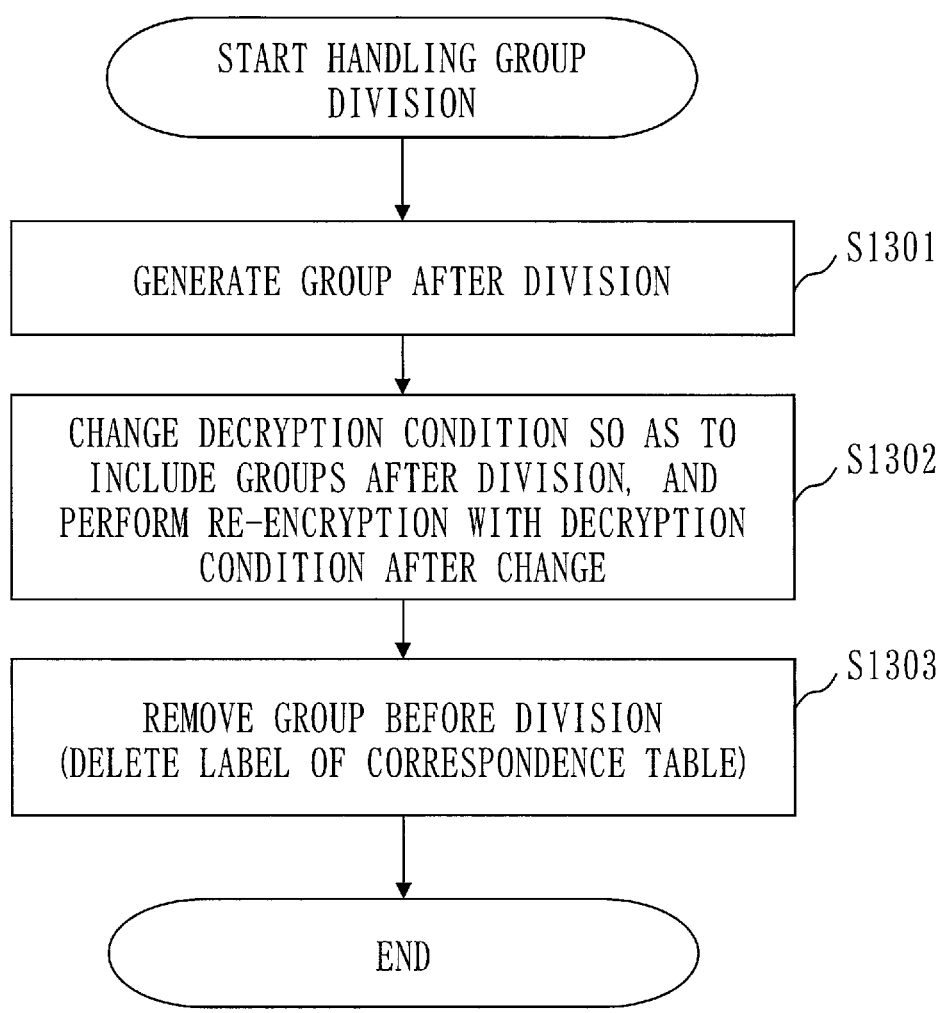
FIG. 29 is a flowchart diagram illustrating an example of processing at the time when a group is divided according to the first embodiment.

FIG. 29 is a flowchart illustrating a procedure to handle an event of dividing a group.

As change processing of a group, there is division processing of a group.

The division processing of a group can be realized by combining two processing of removing processing of a group and generating processing of a group, as with the integration processing of groups; however, it is more convenient that the processing can be instructed as division of a group.

Thus, the procedure of division processing of a group will be described.

Here, the instruction of dividing a group is made by inputting the personnel transfer information 2003 in the personnel transfer event inputting unit 206.

Here, a description is made based on an example of dividing "department=planning and strategic department" into two of "department=planning department" and "department=strategic department."

First, in a step S1301, the personnel transfer event processing unit 207 generates groups after division.

Generation of the groups is similar to that in the step S902 of FIG. 25.

Next, in a step S1302, the personnel transfer event processing unit 207 changes decryption conditions 1002 for encrypted files 1004, wherein the group before division is included in the decryption conditions 1002, so as to make the decryption conditions 1002 include the groups after division.

Then, the personnel transfer event processing unit 207 generates a re-encryption request 6001 whose re-encryption conditions 4005 are the decryption conditions 1002 after change, transmits the re-encryption request 6001 to the re-encryption apparatus 60, and makes the re-encryption apparatus 60 re-encrypt the encrypted files 1004.

A changing method of decryption conditions differs depending on which group after division takes over encrypted files.

There are three patterns of methods for taking over as follows:

(1) One of the groups after division takes over all the encrypted files;
(2) The encrypted files are dividedly taken over by the groups after division; and
(3) Both the groups after division take over the encrypted files.

The personnel transfer information 2003 may include information concerning by which pattern of these patterns the encrypted files are taken over.

Further, it may be possible by other methods that the personnel transfer event processing unit 207 is given an instruction concerning by which pattern the encrypted files are taken over.

Specific examples of taking over are described below for each of (1) through (3).

(1) One of the groups after division takes over all the encrypted files

When "department=planning department" takes over all the encrypted files 1004 including "department=planning and strategic department" in the decryption conditions 1002, the personnel transfer event processing unit 207 makes change to the encrypted files 1004 including "department=planning and strategic department" in the decryption conditions 1002 so that the description of "department=planning and strategic department" is changed into "department=planning department."

For example, in a case of a decryption condition 1002 "department=planning and strategic department AND post=department manager," the personnel transfer event processing unit 207 changes it to a decryption condition 1002 "department=planning department AND post=department manager."

(2) The Encrypted Files are Dividedly Taken Over by the Groups after Division

When encrypted files 1004 including "department=planning and strategic department" in the decryption conditions 1002 are dividedly taken over by "department=planning department" and "department=strategic department," it is determined beforehand which encrypted files 1004 are taken over by which of the divided groups (may be determined according to a specific rule or a user).

The personnel transfer event processing unit 207 makes change to the encrypted files 1004 including "department=planning and strategic department" in the decryption conditions 1002 so that the description of "department=planning and strategic department" in the decryption conditions 1002 is changed to "department=planning department" or "department=strategic department."

For example, in a case of a decryption condition 1002 "department=planning and strategic department AND post=department manager," the personnel transfer event processing unit 207 changes it to decryption conditions 1002 of "department=planning department AND post=department manager" or "department=strategic department AND post=department manager."

(3) Both the Groups after Division Take Over the Encrypted Files

When both "department=planning department" and "department=strategic department" take over encrypted files 1004 including "department=planning and strategic department" in the decryption conditions 1002, the personnel transfer event processing unit 207 makes change to the encrypted files 1004 including "department=planning and strategic department" in the decryption conditions 1002 so as to change the description of "department=planning and strategic department" in the decryption conditions 1002 to "(department=planning department OR department=strategic department)."

For example, in a case of a decryption condition 1002 "department=planning and strategic department AND post=department manager," the personnel transfer event processing unit 207 changes it to a decryption condition 1002 of "(department=planning department OR department=strategic department) AND post=department manager".

Lastly, in a step S1203, the personnel transfer event processing unit 207 performs removing processing of a group before division.

The removing processing of the group is similar to that in a step S1004 of FIG. 26.

In a case of an example of dividing "department=planning and strategic department" into "department=strategic department" and "department=planning department," the personnel transfer event processing unit 207 deletes a numerical conversion rule of "department=planning and strategic department" from the correspondence table (FIG. 4) retained by the attribute conversion unit 208.

Similarly, the decryption condition conversion units 107 in the user terminal apparatuses 10 also delete a numerical conversion rule from the correspondence tables retained by the decryption condition conversion units 107.

Thus far is the explanation of the first embodiment.

*Explanation of Effect*

By the procedures above, according to the present embodiment, it is possible to configure a file encryption system capable of handling personnel transfer while encrypted files remain encrypted, and operable for the long term.

Further, according to the present embodiment, by applying processing (revocation processing) to add a NOT condition, and processing (restoration processing) to change decryption conditions in a proxy re-encryption scheme (for example, Non-Patent Literature 2) to encrypted files encrypted using a functional encryption wherein encryption can be executed using an arbitrary access structure as a parameter, an effect can be obtained that entity conversion and personnel transfer can be handled with the encrypted files encrypted.

Second Embodiment

In the first embodiment, the decryption conditions of the encrypted files 1004 are changed only when personnel transfer events occur.

However, there is a case when change of decryption conditions is necessary apart from personnel transfer events, such as takeover of files and change of access rights to files, etc.

In a present embodiment, it will be described an example of making change to decryption conditions (access rights) of encrypted files 1004 which have already been stored, at an arbitrary timing.

\*\*\*Explanation of Configuration\*\*\*

The configuration of a file encryption system 1 according to the present embodiment is similar to that described in the first embodiment.

Further, configuration examples of function modules of the user terminal apparatuses 10, the key generation apparatus 40, the user information management apparatus 50 and the re-encryption apparatus 60 are similar to those described in the first embodiment.

In the present embodiment, only a configuration of function modules of the data storage apparatus 20 is different from that of the first embodiment.

Figure 30:
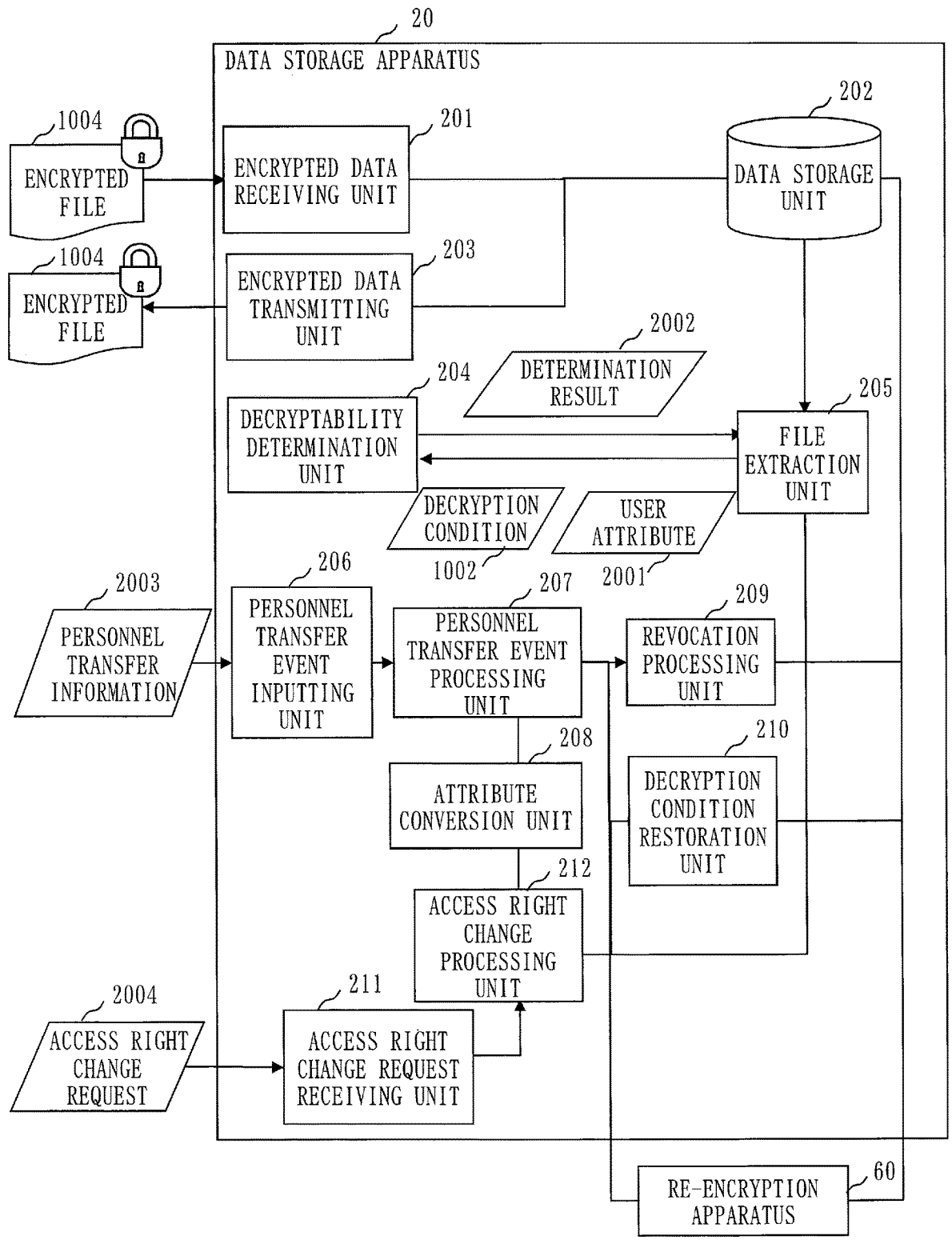
FIG. 30 is a diagram illustrating a configuration example of function modules in a data storage apparatus according to a second embodiment.

FIG. 30 is a diagram illustrating a configuration example of the data storage apparatus 20 according to the present embodiment.

In the following, only the functions different from those in the first embodiment will be described.

An access right change request 2004 is, for example, information as illustrated in FIG. 31.

The access right change request 2004 includes three pieces of information of "access right change type," "user attribute or decryption condition as a change object," "decryption condition to be reset."

In fields of an access right change type, three types of "revocation," "restoration of decryption condition" and "resetting of decryption condition" can be indicated.

When the access right change type is "revocation" or "restoration of decryption condition," attribute information of a user as an object is indicated in the field of the user attribute or decryption condition as a change object.

When the access right change type is "resetting of decryption condition," a decryption condition of an encrypted file 1004 as an object of resetting is indicated in the field of the user attribute or decryption condition as a change object.

In the field of decryption condition to be reset, information is indicated only when the access right change type is "resetting of decryption condition."

An access right change request receiving unit 211 receives an access right change request 2004 reporting change of decryption conditions 1002 in encrypted files 1004 stored in the data storage unit 202.

Then, the access change right request receiving unit 211 transfers the access right change request 2004 to an access right change processing unit 213.

The access right change request 2004 is input by a person having a right to change an access right, for example, the administrator of the file encryption system 1 or an access right administrator, etc.

An access right change processing unit 212 receives the access right change request 2004 transferred by the access right change request receiving unit 211.

Further, the access right change processing unit 212 updates the encrypted files 1004 stored in the data storage unit 202 by using any of the revocation processing unit 209, the decryption condition restoration unit 210 and the re-encryption apparatus 60, according to the access right change type in the access right change request 2004.

Further, the file extraction unit 205 has following functions in addition to the functions in the first embodiment.

When the file extraction unit 205 receives an order from the access right change processing unit 212, the file extraction unit 205 extracts an encrypted file 1004 wherein a decryption condition 1002 which is the same as the decryption condition 1002 indicated in the order from the access right change processing unit 212 is described, from the encrypted files 1004 stored in the data storage unit 202.

Then, the file extraction unit 205 transfers the encrypted file 1004 extracted to the access right change processing unit 212.

\*\*\*Explanation of Operation\*\*\*

Next, operations related to access right change processing according to the present embodiment will be described.

<Change Processing of Access Right>

The present processing is provided by the access right change processing unit 212 in the data storage apparatus 20.

The change processing of an access right is performed when there is an access right change request irrespective of timing when a personnel transfer event occurs.

The access right change processing includes three types of processing of "revocation," "restoration of decryption condition" and "resetting of decryption condition."

Figure 32:
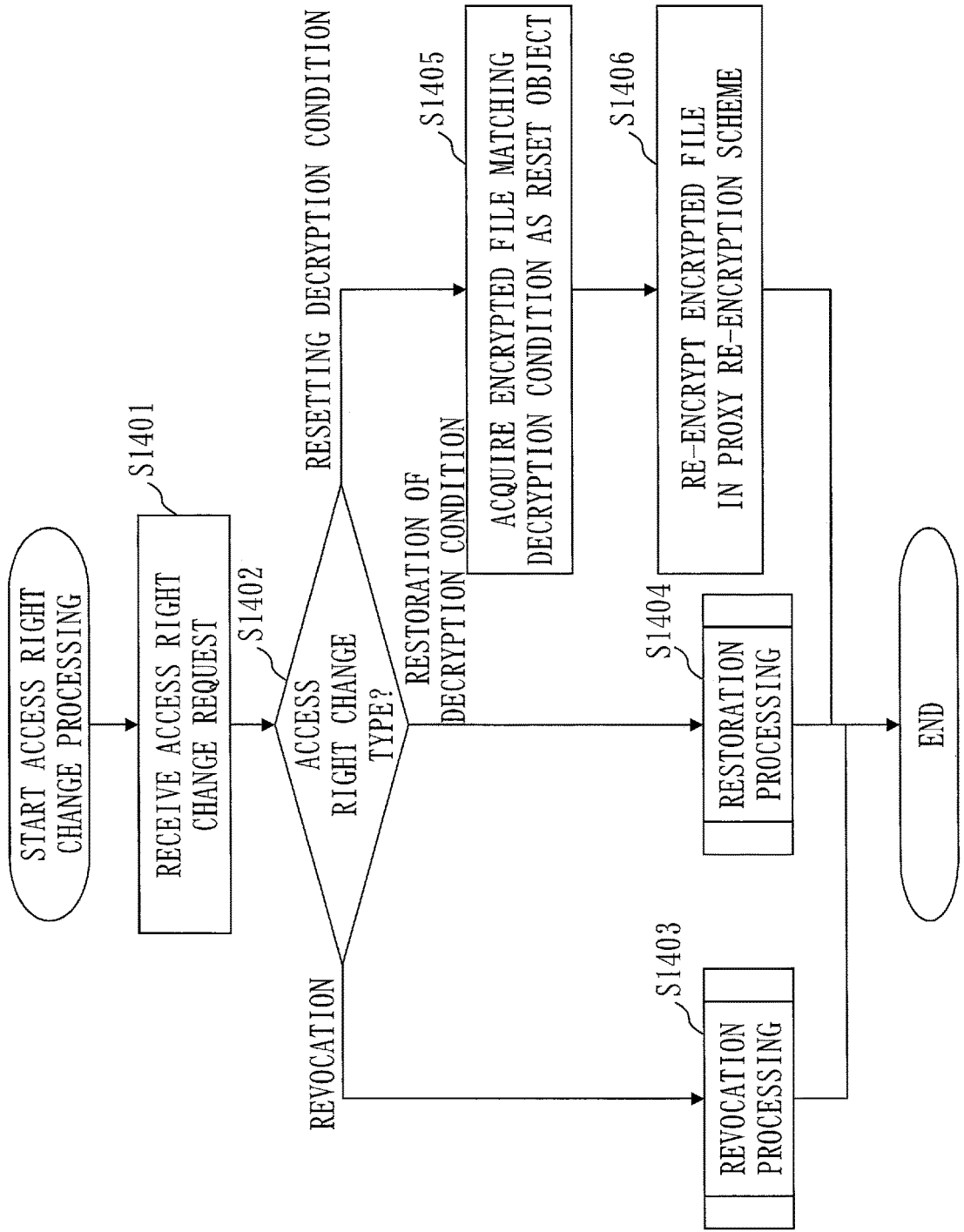
FIG. 32 is a flowchart diagram illustrating an example of change processing of an access right according to the second embodiment.

FIG. 32 is a flowchart illustrating a procedure of the change processing of an access right.

First, in a step S1401, the access right change request receiving unit 211 in the data storage apparatus 20 receives an access right change request 2004.

The access right change request receiving unit 211 transfers the access right change request 2004 to the access right change processing unit 212.

Next, in a step S1402, the access right change processing unit 212 determines an access right change type of the access right change request 2004 received.

When the access right change type is "revocation," the access right change processing unit 212 transfers a user attribute 2001 as a change object included in the access right change request 2004 (a part of "ID=1003, name=Kenichi Suzuki, department=accounting department, section=NULL, post=department manager" in the example of FIG. 31) to the revocation processing unit 209.

In a step S1403, the revocation processing unit 209 performs the revocation processing of the user designated by the user attribute 2001 received.

That is, the revocation processing unit 209 adds revocation information wherein a user attribute of a revoked user who is no more a decryption-permission user due to loss of access right is indicated, to an embedded decryption condition and a decryption condition 1002.

In the step S1402, when the access right change type is "restoration of decryption condition," the access right change processing unit 212 transfers a user attribute 2001 as a change object included in the access right change request 2004 ("ID=1001, name=Hiroshi Takahashi, department=personnel department, section=NULL, post=department manager" in the example of FIG. 31) to the decryption condition restoration unit 210.

In a step S1404, the decryption condition restoration unit 210 performs the restoration processing of the user designated by the user attribute 2001 received.

That is, the decryption condition restoration unit 210 removes revocation information wherein a user attribute of a user who has been restored to a decryption-permission user from a revoked user due to re-acquisition of access right to encrypted data is indicated, from the decryption condition 1002.

In the step S1402, when the access right change type is "resetting of decryption condition," the decryption condition restoration unit 210 first retrieves encrypted files 1004 that match a decryption condition indicated in the "decryption condition as a change object" in the access right change request 2004, by using the file extraction unit 205, in a step S1405.

Next, in a step S1406, the decryption condition restoration unit 210 generates a re-encryption request 6001 from the re-encryption condition 4005 and encrypted files 1004, using a decryption condition 1002 indicated in "decryption condition to be reset" in the access right change request 2004 as a re-encryption condition 4005.

Then, the decryption condition restoration unit 210 transfers the re-encryption request 6001 to the re-encryption apparatus 60.

The re-encryption apparatus 60 re-encrypts the encrypted files 1004 in the data storage unit 202 according to the re-encryption request 6001 received.

Here, the user attributes 2001 and the decryption conditions 1002 at the time of the revocation processing, the restoration processing and the re-encryption processing are processed not in notation of strings as used in the above description (for example, "ID=1001, name=Hiroshi Takahashi, department=personnel department, section=NULL, post=department manager"), but of values given by numerical conversion by the attribute conversion unit 208 (for example, "1=1, 2=101, 3=201, 4=0, 5=303"), whereof description is omitted above.

Thus far is the explanation of the second embodiment.
*Effect of Invention*

Hereinbefore, according to the present embodiment, there is an effect that users can change the access rights (decryption conditions) of encrypted files at arbitrary timing.

Third Embodiment

In the first embodiment, since a logical formula of "AND NOT [ID of a revoked user]" wherein a NOT operator and a user attribute of a revoked user are combined is used for the revocation information, users cannot use the logical formula of "AND NOT [ID information]" for other purposes.

In order to differentiate the logical formula of "AND NOT [ID information]" that a user intendedly assigned from the revocation information "AND NOT [ID information of a revoked user]" due to the revocation processing, information to distinguish "AND NOT [ID information]" assigned by the user from the revocation information due to the revocation processing is retained in header parts 1004a of encrypted files 1004.

When the revocation processing or the restoration processing is performed, the logical formula of "AND NOT [ID information]" assigned by the user is regarded as not an object of processing.

That is, when a logical formula wherein a NOT operator and any user attribute are combined but the logical formula other than revocation information is made to correspond to encrypted data, the revocation processing unit 209 operates distinguishing the logical formula from revocation information.

Similarly, when a logical formula wherein a NOT operator and any user attribute are combined but the logical formula other than revocation information is made to correspond to encrypted data, the decryption condition restoration unit 210 also operates distinguishing the logical formula from revocation information.

Thus far is the explanation of the third embodiment.
*Explanation of Effect*

As stated above, according to the present embodiment, there is an effect that logical AND, logical OR and logical NOT can be used for decryption conditions of encrypted files (use of logical AND, logical OR and logical NOT is referred to as complete system), and arbitrary decryption conditions can be expressed.

Fourth Embodiment

In the first embodiment, encrypted files 1004 stored in the data storage unit 202 in the data storage apparatus 20 are updated at the time personnel transfer events occur.

However, in a case of a system in which the encrypted files 1004 are accessed frequently, when an encrypted file 1004 is accessed while the encrypted file 1004 is being updated, the encrypted file 1004 is accessed using access rights (decryption conditions) before change.

Therefore, update of the encrypted file 1004 may be implemented at the timing as needed, as stated below.

(1) Batch Processing

When frequency of access to the file encryption system 1 differs depending on a time range, update processing of encrypted files is performed intensively in the time range when access frequency is low.

For example, at night or on holiday, etc., the update processing of encrypted files that have piled up by that time is performed.

However, old access right is valid during a period from a change of the access right to an update of the files; therefore, timing of batch processing is examined by an administrator.

(2) On-Demand

In order to have change of decryption conditions of encrypted files according to personnel transfer events or change of access right applied certainly, when there is an access right change request to the data storage unit 202 in the data storage apparatus 20, the update processing is performed for encrypted files 1004 as objects of access.

(3) Interactive

When accesses to a large number of encrypted files occur in on-demand processing, the performance of the system may be degraded.

Therefore, encrypted files 1004 frequently accessed are assessed beforehand, and the encrypted files 1004 frequently accessed are updated preferentially.

For example, a file cache function is introduced in the data storage apparatus 20, and the encrypted files 1004 frequently accessed are updated preferentially according to a state of the file cache.

Thus far is the explanation of the fourth embodiment.

As stated above, according to the present embodiment, there is an effect that change of the access rights to encrypted files are implemented certainly, and the performance of the file encryption system is prevented from degrading.

Fifth Embodiment

In the first embodiment, when the re-encryption apparatus 60 re-encrypts the encrypted files, the key generation apparatus 40 generates the re-encryption key 4006.

Where the proxy re-encryption scheme of Non-Patent Literature 2 is used, in order to generate the re-encryption key 4006, the decryption keys 1005 and the re-encryption conditions 4005 are necessary.

In the present embodiment, a generation method of the re-encryption keys 4006 in a case of using the scheme of Non-Patent Literature 2 will be described.

In order to generate the re-encryption keys 4006 in the scheme of Non-Patent Literature 2, the decryption keys 1005 whereby encrypted files 1004 as objects of re-encryption can be decrypted are necessary.

\*\*\*Explanation of Configuration\*\*\*

Figure 33:
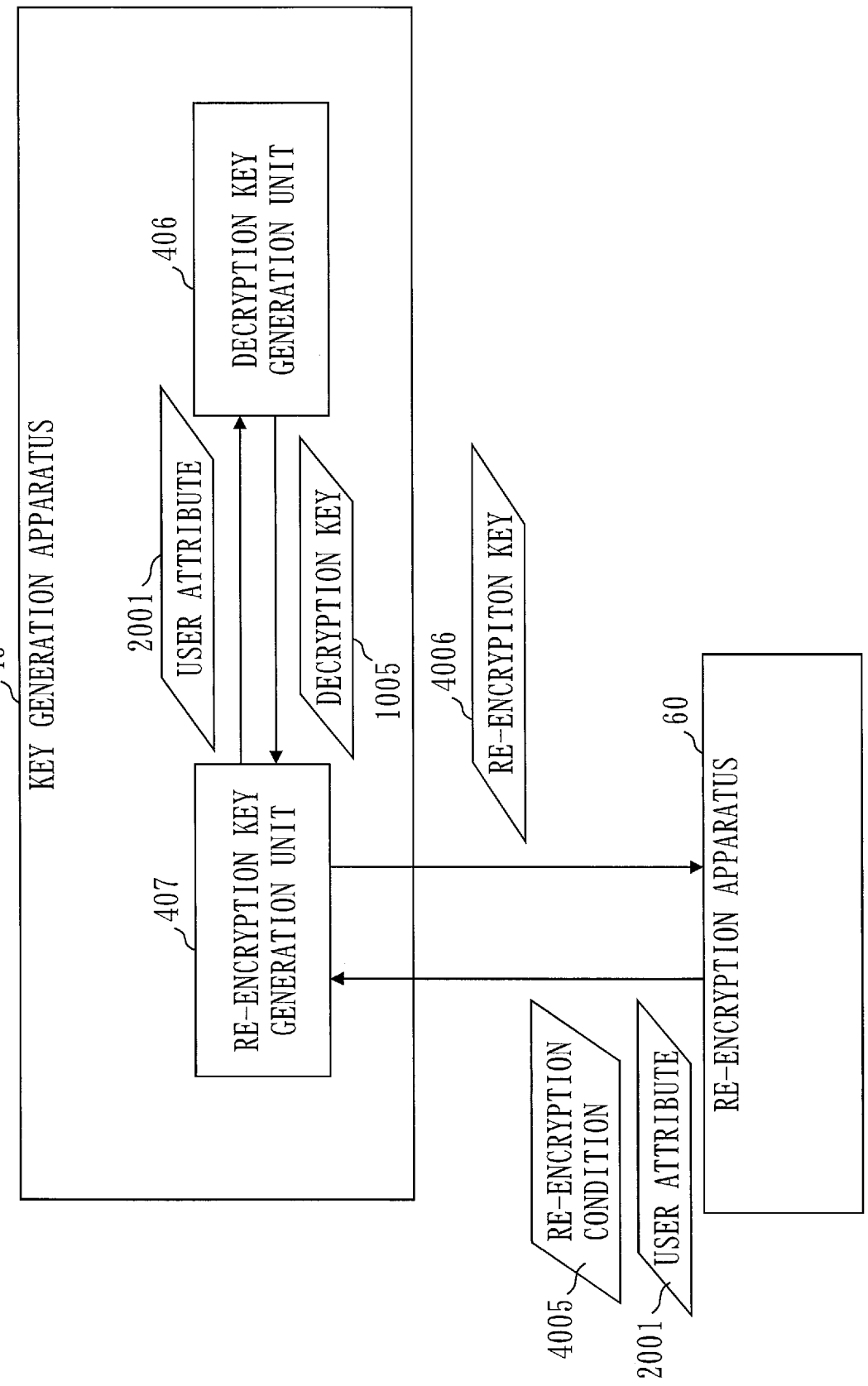
FIG. 33 is a diagram illustrating a configuration example of function modules in a key generation apparatus according to the fifth embodiment.

FIG. 33 is a configuration example of the key generation apparatus 40 in a case of using the scheme of Non-Patent Literature 2.

The decryption key generation unit 406 is similar to that described in the first embodiment.

The re-encryption key generation unit 407 generates a re-encryption key 4006 based on a decryption key 1005 and a re-encryption condition 4005.

Figure 34:
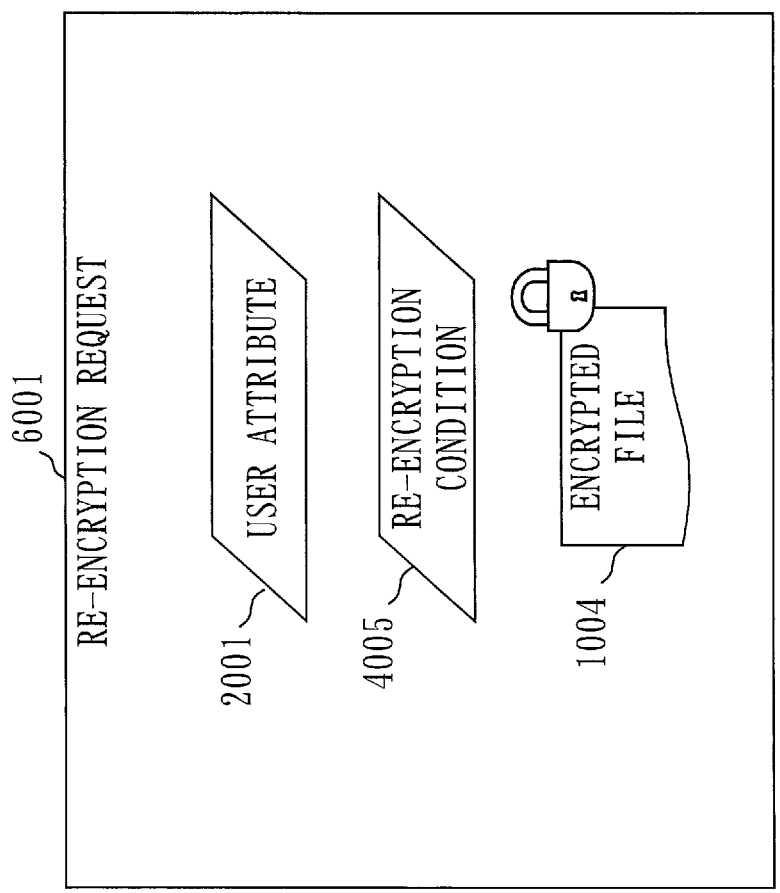
FIG. 34 is a diagram illustrating an example of a re-encryption request according to the fifth embodiment.

Further, FIG. 34 is a configuration example of a re-encryption request 6001 according to the present embodiment.

A re-encryption request 6001 includes a user attribute 2001, a re-encryption condition 4005 and an encrypted file 1004.

\*\*\*Explanation of Operations\*\*\*

In the following, the generation method of a re-encryption key according to the present embodiment will be described.

<Generation of Re-Encryption Key>

The re-encryption apparatus 60 performs re-encryption of a re-encryption request 6001.

Specifically, the re-encryption apparatus 60 retrieves a user attribute 2001 and a re-encryption condition 4005 from the re-encryption request 6001.

Next, the re-encryption apparatus 60 transmits the user attribute 2001 and the re-encryption condition 4005 to the re-encryption key generation unit 407 in the key generation apparatus 40.

The re-encryption key generation unit 407 transfers the user attribute 2001 received from the re-encryption apparatus 60 to the decryption key generation unit 406, and receives a decryption key 1005 from the decryption key generation unit 406.

Further, the re-encryption key generation unit 407 generates a re-encryption key 4006 based on the decryption key 1005 received from the decryption key generation unit 406 and the re-encryption condition 4005 received from the re-encryption apparatus 60.

Then, the re-encryption key generation unit 407 returns the re-encryption key 4006 to the re-encryption apparatus 60.

There is a case wherein a user attribute 2001 is indefinite at the time the re-encryption request 6001 is generated.

In such a case, the data storage apparatus 20 refers to decryption conditions 1002 in encrypted files 1004, and generates an arbitrary user attribute 2001 whereby decryption is possible.

Thus far is the explanation of the fifth embodiment.

\*\*\*Explanation of Effect\*\*\*

As stated above, according to the present embodiment, there is an effect that a proxy re-encryption scheme can be used at the time of re-encrypting encrypted files.

In the above, the embodiments of the present invention are described; however, two or more of the embodiments may be implemented in combination.

Otherwise, one of the embodiments may be partially implemented.

Meanwhile, two or more of the embodiments may be partially implemented in combination.

Here, the present invention is not limited to these embodiments, but can be altered in a various manner as needed.

Lastly, an example of a hardware configuration of the data storage apparatus 20 will be described with reference to FIG. 36.

The data storage apparatus 20 is a computer.

The data storage apparatus 20 is equipped with hardware such as a processor 901, an auxiliary storage device 902, a memory 903, a communication device 904, an input interface 905 and a display interface 906, etc.

The processor 901 is connected to other hardware via a signal line 910 to control these other hardware.

The input interface 905 is connected to an input device 907.

The display interface 906 is connected to a display 908.

The processor 901 is an IC (Integrated Circuit) that performs processing.

The processor 901 is, for example, a CPU (Central Processing Unit), a DSP (Digital Signal Processor), or a GPU (Graphics Processing Unit).

The auxiliary storage device 902 is, for example, a ROM (Read Only Memory), a flash memory, or an HDD (Hard Disk Drive).

The memory 903 is, for example, a RAM (Random Access Memory).

The communication device 904 includes a receiver 9041 to receive data and a transmitter 9042 to transmit data.

The communication device 904 is, for example, a communication chip or an NIC (Network Interface Card).

The input interface 905 is a port whereto a cable 911 of the input device 907 is connected.

The input interface 905 is, for example, a USB (Universal Serial Bus) terminal.

The display interface 906 is a port whereto a cable 912 of the display 908 is connected.

The display interface 906 is, for example, a USB terminal or an HDMI (registered trademark) (High Definition Multimedia Interface) terminal.

The input device 907 is, for example, a mouse, a keyboard, or a touch panel.

The display 908 is, for example, an LCD (Liquid Crystal Display).

In the auxiliary storage device 902, programs to realize the functions of the encrypted data receiving unit 201, the encrypted data transmitting unit 203, the decryptability determination unit 204, the file extraction unit 205, the personnel transfer event inputting unit 206, the personnel transfer event processing unit 207, the attribute conversion unit 208, the revocation processing unit 209 and the decryption condition restoration unit 210 as illustrated in FIG. 5 (hereinafter, the encrypted data receiving unit 201, the encrypted data transmitting unit 203, the decryptability determination unit 204, the file extraction unit 205, the personnel transfer event inputting unit 206, the personnel transfer event processing unit 207, the attribute conversion unit 208, the revocation processing unit 209 and the decryption condition restoration unit 210 are collectively referred to as "units") are stored.

The programs are loaded into the memory 903, read into the processor 901, and executed by the processor 901.

Further, an OS (operating system) is stored in the auxiliary storage device 902.

Then, at least a part of the OS is loaded into the memory 903, and the processor 901 executes the programs to realize the functions of the "units" while executing the OS.

Figure 36:
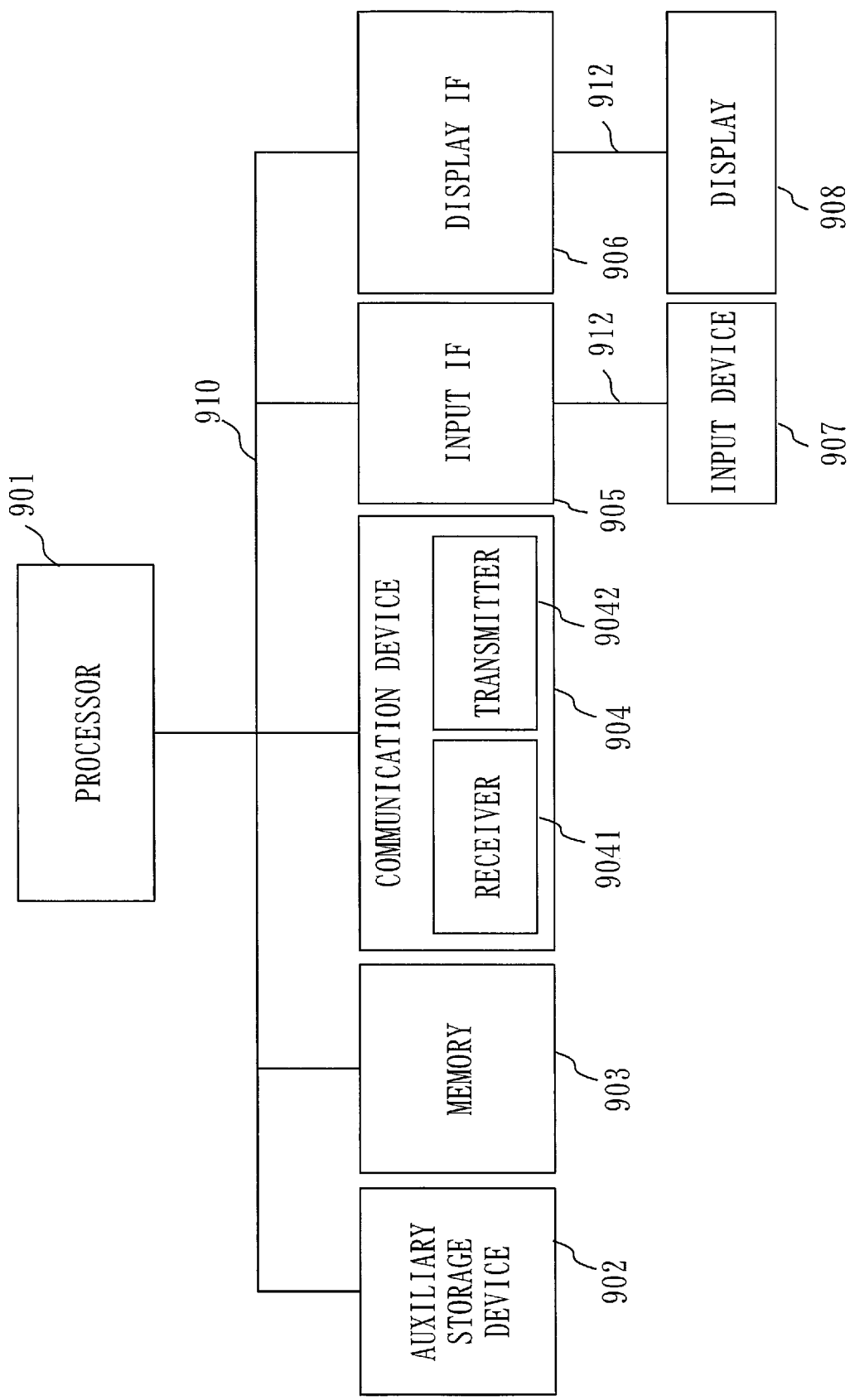
FIG. 36 is a diagram illustrating an example of a hardware configuration of a data storage apparatus according to the first through fifth embodiments.

In FIG. 36, one processor 901 is illustrated; however, the data storage apparatus 20 may be equipped with a plurality of processors 901.

Then, the plurality of processors 901 may execute the programs to realize the functions of the "units" cooperatively.

Additionally, information, data, signal values or variable values indicating the results of the processing by the "units" are stored in the memory 903, the auxiliary storage device 902, or a register or a cache memory in the processor 901.

The "units" may be provided by "circuitry".

Further, the "units" may be replaced with "circuits," "steps," "procedures" or "processing."

The "circuits" and "circuitry" are concepts including not only the processor 901 but also processing circuits of other types, such as a logic IC, a GA (Gate Array), an ASIC (Application Specific Integrated Circuit) and an FPGA (Field-Programmable Gate Array).

REFERENCE SIGNS LIST

1: file encryption system; 10: user terminal apparatus; 20: data storage apparatus; 30: network; 40: key generation apparatus; 50: user information management apparatus; 60: re-encryption apparatus; 101: file input unit; 102 encryption unit; 103: key storage unit; 104: encrypted data transmitting unit; 105: encrypted data receiving unit; 106: decryption unit; 107: decryption condition conversion unit; 201: encrypted data receiving unit; 202: data storage unit; 203: encrypted data transmitting unit; 204: decryptability determination unit; 205: file extraction unit; 206: personnel transfer event inputting unit; 207: personnel transfer event processing unit; 208: attribute conversion unit; 209: revocation processing unit; 210: decryption condition restoration unit; 211: access right change request receiving unit; 212: access right change processing unit; 401: master key generation unit; 402: master key storage unit; 403: public parameter issuance unit; 404: user authentication unit; 405: user attribute acquisition unit; 406: decryption key generation unit; 407: re-encryption key generation unit; 501: attribute information storage unit; 502: user attribute search unit; 601: re-encryption key acquisition unit; 602: re-encryption unit; 1001: data; 1002: decryption condition; 1003: public parameter; 1004: encrypted file; 1005: decryption key; 1021: encrypted data; 2001: user attribute; 2002: determination result; 2003: personnel transfer information; 2004: access right change request; 4001: master public key; 4002: master secret key; 4003: public parameter acquisition request; 4004: user ID; 4005: re-encryption condition; 4006: re-encryption key; 6001: re-encryption request

The invention claimed is:

1. A data storage apparatus comprising processing circuitry to:
receive encrypted data which has been encrypted, in which a decryption condition, whereby a user attribute of a decryption-permission user who is permitted to decrypt the encrypted data is defined, is embedded;
store the encrypted data that has been received, in an encrypted state; and
add revocation information in which a user attribute of a revoked user who is no longer the decryption-permission user is indicated, to an embedded decryption condition that is embedded in the encrypted data, while the encrypted data remains in the encrypted state.

2. The data storage apparatus as defined in claim 1, wherein the processing circuitry
receives, along with the encrypted data, a decryption condition with a same content as the embedded decryption condition, as an external decryption condition, and
adds the revocation information to the external decryption condition, along with addition of the revocation information to the embedded decryption condition.

3. The data storage apparatus as defined in claim 2, wherein the processing circuitry
removes the revocation information from the external decryption condition,
transmits the encrypted data and the external decryption condition from which the revocation information has been removed to a re-encryption apparatus that performs re-encryption in a proxy re-encryption scheme, and
receives the encrypted data that has been re-encrypted in the proxy re-encryption scheme with the external decryption condition from which the revocation information has been removed, from the re-encryption apparatus.

4. The data storage apparatus as defined in claim 3, wherein the processing circuitry
removes revocation information in which a user attribute of a user who has been restored to the decryption-permission user from the revoked user due to a personnel transfer is indicated, from the external decryption condition.

5. The data storage apparatus as defined in claim 3, wherein the processing circuitry
removes revocation information in which a user attribute of a user who has been restored to the decryption-permission user from the revoked user due to re-acquisition of an access right to the encrypted data is indicated, from the external decryption condition.

6. The data storage apparatus as defined in claim 3, wherein the processing circuitry
adds revocation information being a logical formula wherein a NOT operator and the user attribute of the revoked user are combined, to the external decryption condition being a logical formula whereby the user attribute of the decryption-permission user is defined, and
operates distinguishing a logical formula from the revocation information when the logical formula wherein a NOT operator and any user attribute are combined is other than the revocation information, and is made to correspond to the encrypted data.

7. The data storage apparatus as defined in claim 1, wherein the processing circuitry
receives the encrypted data that has been encrypted in an encryption scheme using a basis vector, and
generates a basis vector corresponding to the revocation information, and adds the revocation information to the embedded decryption condition while the encrypted data remains in an encrypted state.

8. The data storage apparatus as defined in claim 7, wherein the processing circuitry
adds the revocation information to the embedded decryption condition while the encrypted data remains in an encrypted state, by changing a span program of the embedded decryption condition corresponding to addition of the revocation information, generating a ciphertext element corresponding to the revocation information based on a share according to secret sharing of the user attribute of the decryption-permission user and the user attribute of the revoked user, and adding the ciphertext element corresponding to the revocation information to a ciphertext element corresponding to the user attribute of the decryption-permission user.

9. The data storage apparatus as defined in claim 1, wherein the processing circuitry adds revocation information in which a user attribute of a revoked user who is no longer the decryption-permission user due to a personnel transfer is indicated, to the embedded decryption condition.

10. The data storage apparatus as defined in claim 1, wherein the processing circuitry adds revocation information in which a user attribute of a revoked user who is no longer the decryption-permission user due to loss of an access right to the encrypted data is indicated, to the embedded decryption condition.

11. The data storage apparatus as defined in claim 1, wherein the processing circuitry adds revocation information being a logical formula wherein a NOT operator and the user attribute of the revoked user are combined, to the embedded decryption condition being a logical formula whereby the user attribute of the decryption-permission user is defined.

12. The data storage apparatus as defined in claim 11, wherein the processing circuitry operates distinguishing a logical formula from the revocation information when the logical formula wherein a NOT operator and any user attribute are combined is other than the revocation information, and is made to correspond to the encrypted data.

13. The data storage apparatus as defined in claim 1, wherein the processing circuitry receives encrypted data that has been encrypted in an encryption scheme, which can be decrypted only with a decryption key whereto a user attribute matching the user attribute of the decryption-permission user is set.

14. A data processing method comprising:

receiving encrypted data which has been encrypted, in which a decryption condition, whereby a user attribute of a decryption-permission user who is permitted to decrypt the encrypted data is defined, is embedded, storing the encrypted data that has been received, in an encrypted state, and adding revocation information in which a user attribute of a revoked user who is no longer the decryption-permission user is indicated, to an embedded decryption condition that is embedded in the encrypted data, while the encrypted data remains in the encrypted state.

15. A non-transitory computer readable medium storing a data processing program that causes a computer to execute:

an encrypted data receiving processing to receive encrypted data which has been encrypted, in which a decryption condition, whereby a user attribute of a decryption-permission user who is permitted to decrypt the encrypted data is defined, is embedded;

a data storage processing to store the encrypted data that has been received by the encrypted data receiving processing, in an encrypted state; and a revocation processing to add revocation information in which a user attribute of a revoked user who is no longer the decryption-permission user is indicated, to an embedded decryption condition that is embedded in the encrypted data, while the encrypted data remains in the encrypted state.

* * * * *